US008684159B2

(12) United States Patent
Blake

(10) Patent No.: US 8,684,159 B2
(45) Date of Patent: Apr. 1, 2014

(54) METHOD AND APPARATUS FOR VARYING COIN-PROCESSING MACHINE RECEPTACLE LIMITS

(71) Applicant: Cummins-Allison Corp., Mt. Prospect, IL (US)

(72) Inventor: John R. Blake, St. Charles, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 13/790,246

(22) Filed: Mar. 8, 2013

(65) Prior Publication Data

US 2013/0199890 A1 Aug. 8, 2013

Related U.S. Application Data

(63) Continuation of application No. 11/055,152, filed on Feb. 10, 2005.

(51) Int. Cl.

| | |
|---|---|
| ***G06F 7/00*** | (2006.01) |
| ***G06F 9/00*** | (2006.01) |
| ***G06F 19/00*** | (2011.01) |

(52) U.S. Cl.

USPC .................. 194/216; 453/2; 453/17; 453/58; 177/51

(58) Field of Classification Search

USPC .......... 194/215–218; 453/1, 2, 16, 17, 58, 63; 177/50, 51, 64, 116–123

See application file for complete search history.

(56) References Cited

U.S. PATENT DOCUMENTS

| | | | | |
|---|---|---|---|---|
| 2,570,920 A | 10/1951 | Clough et al. | .................. | 232/16 |
| 2,669,998 A | 2/1954 | Buchholz | .......................... | 133/8 |
| 2,750,949 A | 6/1956 | Kulo et al. | ........................ | 133/8 |
| 2,835,260 A | 5/1958 | Buchholz | .......................... | 133/8 |
| 2,865,561 A | 12/1958 | Rosapepe | ......................... | 232/7 |
| 3,132,654 A | 5/1964 | Adams | .............................. | 133/1 |

(Continued)

FOREIGN PATENT DOCUMENTS

| | | | |
|---|---|---|---|
| CA | 2235925 C | 11/1995 | ............... G07D 9/00 |
| CA | 2189330 C | 12/2000 | ............. G07F 17/42 |

(Continued)

OTHER PUBLICATIONS

Amid Industries: AI-1500 'Pulsar' High Performance Sorting and Bagging Machine, 13 pages (date unknown, but prior to Dec. 14, 2000).

(Continued)

*Primary Examiner* — Jeffrey Shapiro
(74) *Attorney, Agent, or Firm* — Nixon Peabody LLP

(57) ABSTRACT

In one aspect, a method for optimizing a usable volume of a coin receptacle associated with a coin-processing device includes receiving a plurality of coins in a coin input area of the coin-processing device, obtaining data for each coin from at least one sensor, associating the data for each coin with a denomination, depositing all of the received plurality of coins with an associated denomination into the coin receptacle of the coin-processing device, the coin receptacle being configured to accept, but not dispense, deposited coins until a maximum number of coins occupy the coin receptacle and to securely store the coins in the coin receptacle until removal of the coin receptacle from the coin-processing device and adjusting, responsive to the data, an upper limit of the maximum number of coins which may be deposited into the coin receptacle.

39 Claims, 4 Drawing Sheets

(56) References Cited

U.S. PATENT DOCUMENTS 3,376,970 A 4/1968 Roseberg ........................ 198/40
3,771,583 A 11/1973 Bottemiller ................... 160/327
3,778,595 A 12/1973 Hatanaka et al. ........ 235/61.7 B
3,916,922 A 11/1975 Prumm ........................ 133/3 R
3,998,237 A 12/1976 Kressin ........................ 133/3 A
3,998,379 A 12/1976 Myers et al. .................... 229/33
4,050,218 A 9/1977 Call ................................ 53/167
4,059,122 A 11/1977 Kinoshita ..................... 133/3 D
4,075,460 A 2/1978 Gorgens ........................ 235/420
4,124,111 A 11/1978 Hayashi ........................ 194/102
4,150,740 A 4/1979 Douno .......................... 194/4 C
4,166,945 A 9/1979 Inoyama et al. .............. 235/379
4,172,462 A 10/1979 Uchida et al. ................. 133/3 A
4,179,685 A 12/1979 O'Maley ................ 340/146.3 H
4,179,723 A 12/1979 Spencer ........................ 361/384
4,184,366 A 1/1980 Butler ............................. 73/163
4,197,986 A 4/1980 Nagata .......................... 235/379
4,208,549 A 6/1980 Polillo et al. ............... 179/6.3 R
4,228,812 A 10/1980 Marti ............................ 133/3 F
4,232,295 A 11/1980 McConnell ............... 340/152 R
4,234,003 A 11/1980 Ristvedt et al. ................... 133/3
4,249,552 A 2/1981 Margolin et al. ............. 133/1 R
4,251,867 A 2/1981 Uchida et al. ................. 364/408
4,286,703 A 9/1981 Schuller et al. ........... 194/100 A
RE30,773 E 10/1981 Glaser et al. .................. 235/379
4,310,885 A 1/1982 Azcua et al. .................. 364/405
4,317,957 A 3/1982 Sendrow .................... 178/22.08
4,341,951 A 7/1982 Benton ......................... 235/379
4,355,369 A 10/1982 Garvin .......................... 364/900
4,360,034 A 11/1982 Davila et al. .................. 133/3 D
4,369,442 A 1/1983 Werth et al. .............. 340/825.35
4,380,316 A 4/1983 Glinka et al. ................... 232/16
4,383,540 A 5/1983 DeMeyer et al. ............. 133/3 H
4,385,285 A 5/1983 Horst et al. ....................... 382/3
4,412,292 A 10/1983 Sedam et al. ................. 364/479
4,416,299 A 11/1983 Bergman ...................... 133/1 R
4,417,136 A 11/1983 Rushby et al. ................ 235/379
4,423,316 A 12/1983 Sano et al. .................... 235/379
4,434,359 A 2/1984 Watanabe ..................... 235/379
4,436,103 A 3/1984 Dick ............................ 133/3 D
4,454,414 A 6/1984 Benton ......................... 235/379
4,474,197 A 10/1984 Kinoshita et al. ............. 133/4 A
4,488,116 A 12/1984 Plesko .......................... 324/236
4,531,531 A 7/1985 Johnson et al. ................... 133/3
4,543,969 A 10/1985 Rasmussen ....................... 133/3
4,549,561 A 10/1985 Johnson et al. ................... 133/3
4,556,140 A 12/1985 Okada ........................... 194/4 C
4,558,711 A 12/1985 Yoshiaki et al. ............... 133/3 F
4,564,036 A 1/1986 Ristvedt ............................ 133/3
4,570,655 A 2/1986 Raterman ......................... 133/3
4,594,664 A 6/1986 Hashimoto ................... 364/405
4,602,332 A 7/1986 Hirose et al. .................. 364/408
4,607,649 A 8/1986 Taipale et al. ................ 133/3 C
4,620,559 A 11/1986 Childers et al. ............... 133/3 R
4,641,239 A 2/1987 Takesako ...................... 364/408
4,674,260 A 6/1987 Rasmussen et al. ............ 53/212
4,681,128 A 7/1987 Ristvedt et al. ................... 453/6
4,705,154 A 11/1987 Masho et al. ................. 194/319
4,718,218 A 1/1988 Ristvedt .......................... 53/532
4,731,043 A 3/1988 Ristvedt et al. ................... 453/6
4,733,765 A 3/1988 Watanabe ..................... 194/206
4,749,074 A 6/1988 Ueki et al. .................... 194/317
4,753,624 A 6/1988 Adams et al. ................... 453/10
4,753,625 A 6/1988 Okada ............................. 453/32
4,765,464 A 8/1988 Ristvedt ....................... 206/0.82
4,766,548 A 8/1988 Cedrone et al. ............... 364/479
4,775,353 A 10/1988 Childers et al. ................... 453/6
4,775,354 A 10/1988 Rasmussen et al. ............ 453/10
4,778,983 A 10/1988 Ushikubo ..................... 235/381
4,803,347 A 2/1989 Sugahara et al. ............. 235/379
4,804,830 A 2/1989 Miyagisima et al. ......... 235/379
4,812,629 A 3/1989 O'Neil et al. ................. 235/383
4,839,505 A 6/1989 Bradt et al. ................... 235/381
4,844,369 A 7/1989 Kanayachi .................. 242/56 R
4,848,556 A 7/1989 Shah et al. .................... 194/212
4,863,414 A 9/1989 Ristvedt et al. ................... 453/6
4,883,158 A 11/1989 Kobayashi et al. ........... 194/217
4,884,212 A 11/1989 Stutsman ...................... 364/479
4,900,909 A 2/1990 Nagashima et al. .......... 235/487
4,908,516 A 3/1990 West ............................ 250/556
4,921,463 A 5/1990 Primdahl et al. .................. 453/3
4,936,435 A 6/1990 Griner .......................... 194/317
4,953,086 A 8/1990 Fukatsu ....................... 364/408
4,954,697 A 9/1990 Kokubun et al. .............. 235/381
4,964,495 A 10/1990 Rasmussen ................... 194/344
4,966,570 A 10/1990 Ristvedt et al. ................... 453/6
4,970,655 A 11/1990 Winn et al. ................... 364/479
4,971,187 A 11/1990 Furuya et al. ................ 194/318
4,988,849 A 1/1991 Sasaki et al. .................. 235/379
4,992,647 A 2/1991 Konishi et al. ................ 235/379
4,995,848 A 2/1991 Goh ................................. 453/3
5,009,627 A 4/1991 Rasmussen ..................... 453/10
5,010,238 A 4/1991 Kadono et al. ................ 235/379
5,010,485 A 4/1991 Bigari .......................... 364/408
5,011,455 A 4/1991 Rasmussen ..................... 453/10
5,022,889 A 6/1991 Ristvedt et al. ................... 453/6
5,025,139 A 6/1991 Halliburton, Jr. ............ 235/379
5,026,320 A 6/1991 Rasmussen ....................... 453/6
5,031,098 A 7/1991 Miller et al. ................. 364/405
5,033,602 A 7/1991 Saarinen et al. .............. 194/334
5,039,848 A 8/1991 Stoken .......................... 235/381
5,055,086 A 10/1991 Raterman et al. ............... 453/10
5,055,657 A 10/1991 Miller et al. ................. 235/381
5,064,999 A 11/1991 Okamoto et al. ............ 235/379
5,080,633 A 1/1992 Ristvedt et al. ................... 435/6
5,091,713 A 2/1992 Horne et al. ................. 340/541
5,104,353 A 4/1992 Ristvedt et al. ................... 453/6
5,105,601 A 4/1992 Horiguchi et al. .............. 53/465
5,106,338 A 4/1992 Rasmussen et al. ............ 453/10
5,111,927 A 5/1992 Schulze ....................... 194/209
5,114,381 A 5/1992 Ueda et al. ...................... 453/57
5,120,945 A 6/1992 Nishibe et al. ............... 235/379
5,123,873 A 6/1992 Rasmussen ..................... 453/10
5,129,205 A 7/1992 Rasmussen ....................... 53/52
5,135,435 A 8/1992 Rasmussen ..................... 453/56
5,140,517 A 8/1992 Nagata et al. ................ 364/408
5,141,443 A 8/1992 Rasmussen et al. ............ 453/10
5,141,472 A 8/1992 Todd et al. ...................... 453/10
5,145,455 A 9/1992 Todd ................................ 453/6
5,146,067 A 9/1992 Sloan et al. ................... 235/381
5,154,272 A 10/1992 Nishiumi et al. ............. 194/318
5,163,866 A 11/1992 Rasmussen ..................... 453/10
5,163,867 A 11/1992 Rasmussen ..................... 453/10
5,163,868 A 11/1992 Adams et al. ................... 453/11
5,167,313 A 12/1992 Dobbins et al. ............... 194/317
5,175,416 A 12/1992 Mansvelt et al. ............. 235/379
5,176,565 A 1/1993 Ristvedt et al. ................... 453/6
5,179,517 A 1/1993 Sarbin et al. ................. 364/410
5,183,142 A 2/1993 Latchinian et al. ........... 194/206
5,184,709 A 2/1993 Nishiumi et al. ............. 194/318
5,194,037 A 3/1993 Jones et al. ..................... 453/10
5,197,919 A 3/1993 Geib et al. ....................... 453/10
5,205,780 A 4/1993 Rasmussen ..................... 453/10
5,207,784 A 5/1993 Schwartzendruber ............ 221/6
5,209,696 A 5/1993 Rasmussen et al. ............ 453/10
5,236,071 A 8/1993 Lee .............................. 194/200
5,243,174 A 9/1993 Veeneman et al. ............ 235/381
5,251,738 A 10/1993 Dabrowski .................... 194/206
5,252,811 A 10/1993 Henochowicz et al. ....... 235/379
5,253,167 A 10/1993 Yoshida et al. ............... 364/408
5,263,566 A 11/1993 Nara et al. .................... 194/318
5,265,874 A 11/1993 Dickinson et al. ......... 273/138 A
5,268,561 A 12/1993 Kimura et al. ................ 235/384
5,277,651 A 1/1994 Rasmussen et al. ............ 453/10
5,282,127 A 1/1994 Mii .............................. 364/130
5,286,226 A 2/1994 Rasmussen ..................... 453/10
5,286,954 A 2/1994 Sato et al. ..................... 235/379
5,291,003 A 3/1994 Avnet et al. .................. 235/381
5,291,560 A 3/1994 Daugman ......................... 382/2
5,293,981 A 3/1994 Abe et al. ..................... 194/345
5,297,030 A 3/1994 Vassigh et al. ............... 364/405
5,297,598 A 3/1994 Rasmussen ................... 141/314
5,297,986 A 3/1994 Ristvedt et al. ................... 453/6
5,299,977 A 4/1994 Mazur et al. .................... 453/10

(56) References Cited

U.S. PATENT DOCUMENTS 5,324,922 A 6/1994 Roberts 235/375
5,326,104 A 7/1994 Pease et al. 273/138 A
5,370,575 A 12/1994 Geib et al. 453/3
5,372,542 A 12/1994 Geib et al. 453/10
5,374,814 A 12/1994 Kako et al. 235/379
5,379,344 A 1/1995 Larsson et al. 380/23
5,379,875 A 1/1995 Shames et al. 194/317
5,382,191 A 1/1995 Rasmussen 453/11
5,390,776 A 2/1995 Thompson 194/346
5,401,211 A 3/1995 Geib et al. 453/10
5,404,986 A 4/1995 Hossfield et al. 194/317
5,410,590 A 4/1995 Blood et al. 379/147
RE34,934 E 5/1995 Raterman et al. 453/10
5,425,669 A 6/1995 Geib et al. 453/10
5,429,550 A 7/1995 Mazur et al. 453/10
5,440,108 A 8/1995 Tran et al. 235/381
5,450,938 A 9/1995 Rademacher 194/206
5,453,047 A 9/1995 Mazur et al. 453/10
5,468,182 A 11/1995 Geib 453/10
5,470,079 A 11/1995 LeStrange et al. 273/138 A
5,474,495 A 12/1995 Geib et al. 453/3
5,474,497 A 12/1995 Jones et al. 453/17
5,480,348 A 1/1996 Mazur et al. 453/10
5,489,237 A 2/1996 Geib et al. 453/12
5,500,514 A 3/1996 Veeneman et al. 235/381
5,501,631 A 3/1996 Mennie et al. 453/3
5,507,379 A 4/1996 Mazur et al. 194/318
5,514,034 A 5/1996 Jones et al. 453/10
5,520,577 A 5/1996 Rasmussen 453/56
5,538,468 A 7/1996 Ristvedt et al. 453/3
5,542,880 A 8/1996 Geib et al. 453/10
5,542,881 A 8/1996 Geib 453/10
5,553,320 A 9/1996 Matsuura et al. 235/379
5,559,887 A 9/1996 Davis et al. 380/24
5,564,546 A 10/1996 Molbak et al. 194/216
5,564,974 A 10/1996 Mazur et al. 453/10
5,564,978 A 10/1996 Jones et al. 453/17
5,570,465 A 10/1996 Tsakanikas 395/114
5,573,457 A 11/1996 Watts et al. 453/31
5,584,758 A 12/1996 Geib 453/10
5,592,377 A 1/1997 Lipkin 395/242
5,602,933 A 2/1997 Blackwell et al. 382/116
5,620,079 A 4/1997 Molbak 194/217
5,623,547 A 4/1997 Jones et al. 380/24
5,625,562 A 4/1997 Veeneman et al. 364/479.05
5,630,494 A 5/1997 Strauts 194/317
5,641,050 A 6/1997 Smith et al. 194/210
5,650,605 A 7/1997 Morioka et al. 235/379
5,650,761 A 7/1997 Gomm et al. 235/381
5,652,421 A 7/1997 Veeneman et al. 235/381
5,665,952 A 9/1997 Ziarno 235/380
5,679,070 A 10/1997 Ishida et al. 453/41
5,684,597 A 11/1997 Hossfield et al. 356/384
5,696,366 A 12/1997 Ziarno 235/380
5,743,373 A 4/1998 Strauts 194/318
5,746,299 A 5/1998 Molbak et al. 194/200
5,774,874 A 6/1998 Veeneman et al. 705/27
5,782,686 A 7/1998 Geib et al. 453/10
5,799,767 A 9/1998 Molbak 194/217
5,813,510 A 9/1998 Rademacher 194/206
5,823,315 A 10/1998 Hoffman et al. 194/203
5,830,054 A 11/1998 Petri 453/5
5,838,812 A 11/1998 Pare, Jr. et al. 382/115
5,842,188 A 11/1998 Ramsey et al. 705/416
5,842,916 A 12/1998 Gerrity et al. 453/57
5,850,076 A 12/1998 Morioka et al. 235/379
5,854,581 A 12/1998 Mori et al. 235/379
5,865,673 A 2/1999 Geib et al. 453/10
5,880,444 A 3/1999 Shibata et al. 235/379
5,892,211 A 4/1999 Davis et al. 235/380
5,892,827 A 4/1999 Beach et al. 380/24
5,909,793 A 6/1999 Beach et al. 194/210
5,909,794 A 6/1999 Molbak et al. 194/216
5,913,399 A 6/1999 Takemoto et al. 194/200
5,918,748 A 7/1999 Clark et al. 209/534
5,940,623 A 8/1999 Watts et al. 395/712
5,944,600 A 8/1999 Zimmermann 435/10
5,951,476 A 9/1999 Beach et al. 600/437
5,957,262 A 9/1999 Molbak et al. 194/200
5,988,348 A 11/1999 Martin et al. 194/317
5,995,949 A 11/1999 Morioka et al. 705/43
5,997,395 A 12/1999 Geib et al. 453/10
6,017,270 A 1/2000 Ristvedt et al. 453/5
6,021,883 A 2/2000 Casanova et al. 194/217
6,032,859 A 3/2000 Muehlberger et al. 235/449
6,039,644 A 3/2000 Geib et al. 453/10
6,039,645 A 3/2000 Mazur 453/10
6,042,470 A 3/2000 Geib et al. 453/10
6,047,807 A 4/2000 Molbak 194/217
6,047,808 A 4/2000 Neubarth et al. 194/317
6,056,104 A 5/2000 Neubarth et al. 194/317
6,080,056 A 6/2000 Karlsson 453/3
6,082,519 A 7/2000 Martin et al. 194/350
6,086,471 A 7/2000 Zimmermann 453/3
6,095,313 A 8/2000 Molbak et al. 194/344
6,116,402 A 9/2000 Beach et al. 194/216
6,131,625 A 10/2000 Casanova et al. 141/314
6,139,418 A 10/2000 Geib et al. 453/10
6,142,285 A 11/2000 Panzeri et al. 194/328
6,145,738 A 11/2000 Stinson et al. 235/379
6,154,879 A 11/2000 Pare, Jr. et al. 902/3
6,168,001 B1 1/2001 Davis 194/200
6,171,182 B1 1/2001 Geib et al. 453/10
6,174,230 B1 1/2001 Gerrity et al. 453/57
6,196,371 B1 3/2001 Martin et al. 194/317
6,196,913 B1 3/2001 Geib et al. 453/10
6,230,928 B1 5/2001 Hanna et al. 221/13
6,264,545 B1 7/2001 Magee et al. 453/3
6,308,887 B1 10/2001 Korman et al. 235/379
6,318,536 B1 11/2001 Korman et al. 194/217
6,318,537 B1 11/2001 Jones et al. 194/346
6,349,972 B1 2/2002 Geiger et al. 283/67
6,412,620 B1 7/2002 Imura 194/317
6,431,342 B1 8/2002 Schwartz 194/346
6,438,230 B1 8/2002 Moore 380/42
6,456,928 B1 9/2002 Johnson 701/114
6,471,030 B1 10/2002 Neubarth et al. 194/317
6,474,548 B1 11/2002 Montross et al. 235/379
6,484,863 B1 11/2002 Molbak 194/216
6,484,884 B1 11/2002 Gerrity et al. 209/233
6,494,776 B1 12/2002 Molbak 453/32
6,499,277 B1 12/2002 Warner et al. 53/447
6,503,138 B2 1/2003 Spoehr et al. 453/10
6,520,308 B1 2/2003 Martin et al. 194/317
6,522,772 B1 2/2003 Morrison et al. 382/124
6,547,131 B1 4/2003 Foodman et al. 235/380
6,552,781 B1 4/2003 Rompel et al. 256/71
6,554,185 B1 4/2003 Montross et al. 235/379
6,579,165 B2 6/2003 Kuhlin et al. 453/3
6,581,042 B2 6/2003 Pare, Jr. et al. 705/40
6,602,125 B2 8/2003 Martin 453/12
6,609,604 B1 8/2003 Jones et al. 194/302
6,612,921 B2 9/2003 Geib et al. 453/13
6,637,576 B1 10/2003 Jones et al. 194/216
6,640,956 B1 11/2003 Zwieg et al. 194/328
6,644,696 B2 11/2003 Brown et al. 283/67
6,655,585 B2 12/2003 Shinn 235/382
6,659,259 B2 12/2003 Knox et al. 194/217
6,662,166 B2 12/2003 Pare, Jr. et al. 705/39
6,663,675 B2 12/2003 Blake et al. 753/63
6,666,318 B2 12/2003 Gerrity et al. 194/347
6,755,730 B2 6/2004 Geib et al. 453/3
6,758,316 B2 7/2004 Molbak 194/200
6,761,308 B1 7/2004 Hanna et al. 235/379
6,766,892 B2 7/2004 Martin et al. 194/317
6,783,452 B2 8/2004 Hino et al. 453/3
6,783,785 B1 8/2004 Raghavan et al. 426/489
6,786,398 B1 9/2004 Stinson et al. 235/379
6,854,581 B2 2/2005 Molbak 194/344
6,854,640 B2 2/2005 Peklo 235/100
6,863,168 B1 3/2005 Gerrity et al. 194/347
6,892,871 B2 5/2005 Strauts et al. 194/302
6,896,118 B2 5/2005 Jones et al. 194/217
6,928,546 B1 8/2005 Nanavati et al. 713/186

(56) References Cited

U.S. PATENT DOCUMENTS

| | | | | |
|---|---|---|---|---|
| 6,950,810 | B2 | 9/2005 | Lapsley et al. | 705/78 |
| 6,953,150 | B2 | 10/2005 | Shepley et al. | 235/379 |
| 6,957,746 | B2 | 10/2005 | Martin et al. | 221/131 |
| 6,966,417 | B2 | 11/2005 | Peklo et al. | 194/344 |
| 6,976,570 | B2 | 12/2005 | Molbak | 194/215 |
| 6,988,606 | B2 | 1/2006 | Geib et al. | 194/334 |
| 6,991,530 | B2 | 1/2006 | Hino et al. | 453/3 |
| 7,004,831 | B2 | 2/2006 | Hino et al. | 453/5 |
| 7,014,029 | B2 | 3/2006 | Winters | 194/302 |
| 7,014,108 | B2 | 3/2006 | Sorenson et al. | 235/381 |
| 7,017,729 | B2 | 3/2006 | Gerrity et al. | 194/347 |
| 7,018,286 | B2 | 3/2006 | Blake et al. | 453/61 |
| 7,028,827 | B1 | 4/2006 | Molbak et al. | 194/346 |
| 7,036,651 | B2 | 5/2006 | Tam et al. | 194/217 |
| 7,083,036 | B2 | 8/2006 | Adams | 194/223 |
| 7,113,929 | B1 | 9/2006 | Beach et al. | 705/65 |
| 7,131,580 | B2 | 11/2006 | Molbak | 235/379 |
| 7,149,336 | B2 | 12/2006 | Jones et al. | 382/135 |
| 7,152,727 | B2 | 12/2006 | Waechter | 194/317 |
| 7,158,662 | B2 | 1/2007 | Chiles | 382/135 |
| 7,188,720 | B2 | 3/2007 | Geib et al. | 194/302 |
| 7,213,697 | B2 | 5/2007 | Martin et al. | 194/317 |
| 7,243,773 | B2 | 7/2007 | Bochonok et al. | 194/350 |
| 7,269,279 | B2 | 9/2007 | Chiles | 382/135 |
| 7,303,119 | B2 | 12/2007 | Molbak | 235/379 |
| 7,331,521 | B2 | 2/2008 | Sorenson et al. | 235/381 |
| 7,337,890 | B2 | 3/2008 | Bochonok et al. | 194/353 |
| 7,427,230 | B2 | 9/2008 | Blake et al. | 453/63 |
| 7,438,172 | B2 | 10/2008 | Long et al. | 194/347 |
| 7,464,802 | B2 | 12/2008 | Gerrity et al. | 194/347 |
| 7,500,568 | B2 | 3/2009 | Cousin | 209/534 |
| 7,520,374 | B2 | 4/2009 | Martin et al. | 194/317 |
| 7,551,764 | B2 | 6/2009 | Chiles et al. | 382/135 |
| 7,552,810 | B2 | 6/2009 | Mecklenburg | 194/317 |
| 7,580,859 | B2 | 8/2009 | Economy | 705/16 |
| 7,654,450 | B2 | 2/2010 | Mateen et al. | 235/379 |
| 7,658,270 | B2 | 2/2010 | Bochonok et al. | 194/350 |
| 7,735,125 | B1 | 6/2010 | Alvarez et al. | 726/9 |
| 7,743,902 | B2 | 6/2010 | Wendell et al. | 194/302 |
| 7,778,456 | B2 | 8/2010 | Jones et al. | 382/135 |
| 7,819,308 | B2 | 10/2010 | Osterberg et al. | 235/379 |
| 7,874,478 | B2 | 1/2011 | Molbak | 235/379 |
| 7,886,890 | B2 | 2/2011 | Blake et al. | 194/347 |
| 7,931,304 | B2 | 4/2011 | Brown et al. | 283/57 |
| 7,946,406 | B2 | 5/2011 | Blake et al. | 194/200 |
| 7,963,382 | B2 | 6/2011 | Wendell et al. | 194/302 |
| 7,980,378 | B2 | 7/2011 | Jones et al. | 194/217 |
| 8,023,715 | B2 | 9/2011 | Jones et al. | 382/135 |
| 8,042,732 | B2 | 10/2011 | Blake et al. | 235/375 |
| 8,229,821 | B2 | 7/2012 | Mennie et al. | 232/16 |
| 8,393,455 | B2 | 3/2013 | Blake et al. | 194/350 |
| 8,443,958 | B2 | 5/2013 | Jones et al. | 194/215 |
| RE44,252 | E | 6/2013 | Jones et al. | 194/217 |
| 2001/0034203 | A1 | 10/2001 | Geib et al. | 453/3 |
| 2001/0048025 | A1 | 12/2001 | Shinn | 235/382 |
| 2002/0065033 | A1 | 5/2002 | Geib et al. | 453/3 |
| 2002/0069104 | A1 | 6/2002 | Beach et al. | 705/14 |
| 2002/0074209 | A1 | 6/2002 | Karlsson | 194/330 |
| 2002/0095587 | A1 | 7/2002 | Doyle et al. | 713/186 |
| 2002/0107738 | A1 | 8/2002 | Beach et al. | 705/14 |
| 2002/0126885 | A1 | 9/2002 | Mennie et al. | 382/135 |
| 2002/0130011 | A1 | 9/2002 | Casanova et al. | 194/344 |
| 2002/0147588 | A1 | 10/2002 | Davis et al. | 704/246 |
| 2002/0151267 | A1 | 10/2002 | Kuhlin et al. | 453/3 |
| 2002/0174348 | A1 | 11/2002 | Ting | 713/186 |
| 2002/0179401 | A1 | 12/2002 | Knox et al. | 194/217 |
| 2003/0004878 | A1 | 1/2003 | Akutsu et al. | 705/43 |
| 2003/0013403 | A1 | 1/2003 | Blake et al. | 453/60 |
| 2003/0081824 | A1 | 5/2003 | Mennie et al. | 382/135 |
| 2003/0127299 | A1 | 7/2003 | Jones et al. | 194/217 |
| 2003/0168309 | A1 | 9/2003 | Geib et al. | 194/302 |
| 2003/0168310 | A1 | 9/2003 | Strauts et al. | 194/302 |
| 2003/0182217 | A1 | 9/2003 | Chiles | 705/35 |
| 2003/0190882 | A1 | 10/2003 | Blake et al. | 453/63 |
| 2003/0234153 | A1 | 12/2003 | Blake et al. | 194/347 |
| 2004/0055902 | A1 | 3/2004 | Peklo | 206/0.815 |
| 2004/0092222 | A1 | 5/2004 | Kowalczyk et al. | 453/12 |
| 2004/0153406 | A1 | 8/2004 | Alarcon-Luther et al. | 705/41 |
| 2004/0153421 | A1 | 8/2004 | Robinson | 705/75 |
| 2004/0154899 | A1 | 8/2004 | Peklo et al. | 193/33 |
| 2004/0173432 | A1 | 9/2004 | Jones | 194/216 |
| 2004/0188221 | A1 | 9/2004 | Carter | 194/215 |
| 2004/0199924 | A1 | 10/2004 | Ganesh et al. | 719/313 |
| 2004/0200691 | A1 | 10/2004 | Geib et al. | 194/302 |
| 2004/0256197 | A1 | 12/2004 | Blake et al. | 194/350 |
| 2005/0006197 | A1 | 1/2005 | Wendell et al. | 194/302 |
| 2005/0035140 | A1 | 2/2005 | Carter | 221/195 |
| 2005/0040007 | A1 | 2/2005 | Geib et al. | 194/302 |
| 2005/0040225 | A1 | 2/2005 | Csulits et al. | 235/379 |
| 2005/0045450 | A1 | 3/2005 | Geib et al. | 194/318 |
| 2005/0067305 | A1 | 3/2005 | Bochonok et al. | 206/8 |
| 2005/0077142 | A1 | 4/2005 | Tam et al. | 194/217 |
| 2005/0087425 | A1 | 4/2005 | Peklo | 194/350 |
| 2005/0098625 | A1 | 5/2005 | Walker et al. | 235/381 |
| 2005/0108165 | A1 | 5/2005 | Jones et al. | 705/43 |
| 2005/0109836 | A1 | 5/2005 | Ben-Aissa | 235/380 |
| 2005/0121507 | A1 | 6/2005 | Brown et al. | 235/379 |
| 2005/0124407 | A1 | 6/2005 | Rowe | 463/25 |
| 2005/0156318 | A1 | 7/2005 | Douglas | 257/761 |
| 2005/0205654 | A1 | 9/2005 | Carter | 235/7 R |
| 2005/0205655 | A1 | 9/2005 | Carter | 235/7 R |
| 2005/0228717 | A1 | 10/2005 | Gusler et al. | 705/14 |
| 2005/0256792 | A1 | 11/2005 | Shimizu et al. | 705/35 |
| 2006/0037835 | A1 | 2/2006 | Doran et al. | 194/302 |
| 2006/0054455 | A1 | 3/2006 | Kuykendall et al. | 194/217 |
| 2006/0054457 | A1 | 3/2006 | Long et al. | 194/347 |
| 2006/0060363 | A2 | 3/2006 | Carter | 172/111 |
| 2006/0064379 | A1 | 3/2006 | Doran et al. | 705/42 |
| 2006/0065717 | A1 | 3/2006 | Hurwitz et al. | 235/381 |
| 2006/0069654 | A1 | 3/2006 | Beach et al. | 705/65 |
| 2006/0148394 | A1 | 7/2006 | Blake et al. | 453/12 |
| 2006/0149415 | A1 | 7/2006 | Richards | 700/236 |
| 2006/0151285 | A1 | 7/2006 | String | 194/350 |
| 2006/0154589 | A1 | 7/2006 | String | 453/11 |
| 2006/0175176 | A1 | 8/2006 | Blake | 194/216 |
| 2006/0182330 | A1 | 8/2006 | Chiles | 382/135 |
| 2006/0196754 | A1 | 9/2006 | Bochonok et al. | 194/347 |
| 2006/0205481 | A1 | 9/2006 | Dominelli | 463/25 |
| 2006/0207856 | A1 | 9/2006 | Dean et al. | 194/302 |
| 2006/0219519 | A1 | 10/2006 | Molbak et al. | 194/346 |
| 2007/0051582 | A1 | 3/2007 | Bochonok et al. | 194/202 |
| 2007/0071302 | A1 | 3/2007 | Jones et al. | 382/135 |
| 2007/0108015 | A1 | 5/2007 | Bochonok et al. | 194/350 |
| 2007/0119681 | A1 | 5/2007 | Blake et al. | 194/215 |
| 2007/0181676 | A1 | 8/2007 | Mateen et al. | 235/381 |
| 2007/0187494 | A1 | 8/2007 | Hanna | 235/383 |
| 2007/0221470 | A1 | 9/2007 | Mennie et al. | 194/216 |
| 2007/0269097 | A1 | 11/2007 | Chiles et al. | 382/135 |
| 2008/0033829 | A1 | 2/2008 | Mennie et al. | 705/16 |
| 2008/0044077 | A1 | 2/2008 | Mennie et al. | 382/135 |
| 2008/0220707 | A1 | 9/2008 | Jones et al. | 453/2 |
| 2009/0018959 | A1 | 1/2009 | Doran et al. | 705/44 |
| 2009/0236200 | A1 | 9/2009 | Hallowell et al. | 194/215 |
| 2009/0236201 | A1 | 9/2009 | Blake et al. | 194/215 |
| 2009/0239459 | A1 | 9/2009 | Watts et al. | 453/18 |
| 2009/0242626 | A1 | 10/2009 | Jones et al. | 235/379 |
| 2009/0320106 | A1 | 12/2009 | Jones et al. | 726/5 |
| 2010/0038419 | A1 | 2/2010 | Blake et al. | 235/379 |
| 2010/0198726 | A1 | 8/2010 | Doran et al. | 705/41 |
| 2010/0261421 | A1 | 10/2010 | Wendell et al. | 453/4 |
| 2010/0276485 | A1 | 11/2010 | Jones et al. | 235/379 |
| 2010/0327005 | A1 | 12/2010 | Martin et al. | 221/98 |
| 2011/0098845 | A1 | 4/2011 | Mennie et al. | 700/223 |
| 2011/0099105 | A1 | 4/2011 | Mennie et al. | 705/41 |
| 2011/0270695 | A1 | 11/2011 | Jones et al. | 705/43 |
| 2012/0067950 | A1 | 3/2012 | Blake | 235/381 |
| 2012/0156976 | A1 | 6/2012 | Blake et al. | 453/4 |

FOREIGN PATENT DOCUMENTS

| | | | | |
|---|---|---|---|---|
| CA | 2143943 | C | 3/2003 | G07D 3/16 |
| DE | 06 60 354 | | 5/1938 | G07F 17/26 |
| DE | 30 21 327 | A1 | 12/1981 | G07D 3/06 |
| EP | 0 351 217 | A2 | 1/1990 | G07F 9/04 |

(56) References Cited

FOREIGN PATENT DOCUMENTS

| | | | | |
|---|---|---|---|---|
| EP | 0 667 973 | B1 | 1/1997 | G07D 3/14 |
| EP | 0 926 634 | A2 | 6/1999 | G07D 3/14 |
| EP | 1 104 920 | A1 | 6/2001 | G07D 5/08 |
| EP | 1 209 639 | A2 | 5/2002 | G07F 19/00 |
| EP | 1 528 513 | A1 | 5/2005 | G07F 7/08 |
| FR | 2042254 | | 2/1971 | G07B 11/00 |
| GB | 2035642 | A | 6/1980 | G07F 7/10 |
| GB | 2175427 | A | 11/1986 | G07F 17/42 |
| GB | 2198274 | A | 6/1988 | G07D 3/00 |
| GB | 2458387 | A | 9/2009 | G07D 11/00 |
| GB | 2468783 | A | 9/2010 | C07D 9/00 |
| JP | 49-058899 | | 6/1974 | |
| JP | 52-014495 | | 2/1977 | G07F 5/10 |
| JP | 52-071300 | A | 6/1977 | G07F 5/22 |
| JP | 56-040992 | A | 4/1981 | G07F 5/18 |
| JP | 57-117080 | A | 7/1982 | G07D 3/16 |
| JP | 59-079392 | A | 5/1984 | G07D 3/16 |
| JP | 60-016271 | U | 2/1985 | G07D 7/02 |
| JP | 62-134168 | U | 8/1987 | G07B 1/00 |
| JP | 62-182995 | A | 8/1987 | G07F 7/08 |
| JP | 62-221773 | A | 9/1987 | G07F 15/30 |
| JP | 62-166562 | U | 10/1987 | G07B 1/00 |
| JP | 64-035683 | A | 2/1989 | G07D 9/00 |
| JP | 64-042789 | A | 2/1989 | G07F 9/00 |
| JP | 64-067698 | A | 3/1989 | G07F 7/08 |
| JP | 01-118995 | A | 5/1989 | G07G 1/00 |
| JP | 01-307891 | A | 12/1989 | G07D 9/00 |
| JP | 02-050793 | A | 2/1990 | G07D 9/00 |
| JP | 02-252096 | A | 10/1990 | G07D 9/00 |
| JP | 03-012776 | A | 1/1991 | G06F 15/30 |
| JP | 03-063795 | A | 3/1991 | G07D 3/00 |
| JP | 03-092994 | A | 4/1991 | G07D 9/00 |
| JP | 03-156673 | A | 7/1991 | G07F 15/30 |
| JP | 04-085695 | A | 3/1992 | G07F 11/72 |
| JP | 04-175993 | A | 6/1992 | G07F 5/22 |
| JP | 05-046839 | A | 2/1993 | G07D 5/02 |
| JP | 05-217048 | A | 8/1993 | G07D 3/16 |
| JP | 05-274527 | A | 10/1993 | G07D 9/00 |
| JP | 06-035946 | A | 2/1994 | G06F 15/30 |
| JP | 06-103285 | A | 4/1994 | G06F 15/21 |
| JP | 09-251566 | A | 9/1997 | G07F 7/08 |
| JP | 2002-117439 | A | 4/2002 | G07D 9/00 |
| JP | 2003-242287 | A | 8/2003 | G06F 17/60 |
| JP | 2004-213188 | A | 7/2004 | G06F 17/60 |
| SE | 44 244 | | 9/1988 | 19/2 |
| WO | WO 85/00909 | A1 | 2/1985 | G07D 5/02 |
| WO | WO 91/06927 | A1 | 5/1991 | G07D 3/16 |
| WO | WO 91/08952 | A1 | 6/1991 | B65B 11/04 |
| WO | WO 91/12594 | A1 | 8/1991 | G07D 3/16 |
| WO | WO 91/18371 | A1 | 11/1991 | G07D 3/16 |
| WO | WO 92/08212 | A1 | 5/1992 | G07D 3/16 |
| WO | WO 92/20043 | A1 | 11/1992 | G07D 3/00 |
| WO | WO 92/20044 | A1 | 11/1992 | G07D 3/16 |
| WO | WO 92/22044 | A1 | 12/1992 | G07D 3/00 |
| WO | WO 93/00660 | A1 | 1/1993 | G07D 3/00 |
| WO | WO 93/09621 | A1 | 5/1993 | H01L 9/32 |
| WO | WO 94/06101 | A1 | 3/1994 | G07D 3/16 |
| WO | WO 94/08319 | A1 | 4/1994 | G07D 3/00 |
| WO | WO 94/23397 | A1 | 10/1994 | G07D 3/00 |
| WO | WO 95/02226 | A1 | 1/1995 | G07D 3/00 |
| WO | WO 95/04978 | A1 | 2/1995 | G07D 3/06 |
| WO | WO 95/06920 | A1 | 3/1995 | G07D 3/16 |
| WO | WO 95/09406 | A1 | 4/1995 | G07D 3/16 |
| WO | WO 95/13596 | A1 | 5/1995 | G07D 3/14 |
| WO | WO 95/19017 | A1 | 7/1995 | G07D 1/00 |
| WO | WO 95/23387 | A1 | 8/1995 | G07D 3/16 |
| WO | WO 95/30215 | A1 | 11/1995 | G07F 17/42 |
| WO | WO 96/07163 | A1 | 3/1996 | G07D 3/06 |
| WO | WO 96/07990 | A1 | 3/1996 | G07D 3/16 |
| WO | WO 96/12253 | A1 | 4/1996 | G07D 3/00 |
| WO | WO 96/27525 | A1 | 9/1996 | B65B 11/02 |
| WO | WO 96/27859 | A1 | 9/1996 | G06D 5/08 |
| WO | WO 97/22919 | A1 | 6/1997 | G07F 7/08 |
| WO | WO 97/25692 | A1 | 7/1997 | G07D 3/06 |
| WO | WO 98/24041 | A1 | 6/1998 | G06F 17/60 |
| WO | WO 98/24067 | A1 | 6/1998 | G07D 3/14 |
| WO | WO 98/48383 | A2 | 10/1998 | G07D 1/00 |
| WO | WO 98/48384 | A2 | 10/1998 | G07D 1/00 |
| WO | WO 98/48385 | A2 | 10/1998 | G07D 1/00 |
| WO | WO 98/51082 | A1 | 11/1998 | H04N 7/18 |
| WO | WO 98/59323 | A1 | 12/1998 | G07D 3/00 |
| WO | WO 99/00776 | A1 | 1/1999 | G07F 9/06 |
| WO | WO 99/06937 | A1 | 2/1999 | G06F 19/00 |
| WO | WO 99/16027 | A2 | 4/1999 | G07F 7/02 |
| WO | WO 99/33030 | A1 | 7/1999 | G07D 3/00 |
| WO | WO 99/41695 | A1 | 8/1999 | G07K 5/00 |
| WO | WO 99/48057 | A1 | 9/1999 | G07D 3/06 |
| WO | WO 99/48058 | A1 | 9/1999 | G07D 3/06 |
| WO | WO 00/48911 | A1 | 8/2000 | B65B 67/12 |
| WO | WO 00/65546 | A1 | 11/2000 | G07F 1/04 |
| WO | WO 01/63565 | A2 | 8/2001 | G07D 9/00 |
| WO | WO 02/071343 | A1 | 9/2002 | G07D 3/00 |
| WO | WO 03/052700 | A2 | 6/2003 | |
| WO | WO 03/079300 | A1 | 9/2003 | G07D 7/00 |
| WO | WO 03/085610 | A1 | 10/2003 | G07D 9/06 |
| WO | WO 03/107280 | A2 | 12/2003 | |
| WO | WO 2004/044853 | A1 | 5/2004 | G06D 3/12 |
| WO | WO 2004/109464 | A2 | 12/2004 | |
| WO | WO 2005/041134 | A2 | 5/2005 | |
| WO | WO 2005/088563 | A1 | 9/2005 | G07D 3/00 |
| WO | WO 2006/086531 | A1 | 8/2006 | G07D 9/00 |
| WO | WO 2007/035420 | A2 | 3/2007 | G06F 7/00 |
| WO | WO 2007/120825 | A2 | 10/2007 | G06K 9/00 |

OTHER PUBLICATIONS

UIi: Coinverter—"No More Lines . . . Self-Serve Cash-Out," by Cassius Elston, 1995 World Games Congress/Exposition Converter, 1 page (dated prior to 1995).

Brandt: 95 Series Coin Sorter Counter, 2 pages (1982).

Brandt: Model 817 Automated Coin and Currency Ordering System, 2 pages (1983).

Brandt: Model 920/925 Counter, 2 pages (date unknown, prior to Jul. 2011, possibly prior to Mar. 17, 1997).

Brandt: System 930 Electric Counter/Sorter, "Solving Problems, Pleasing Customer, Building Deposits," 1 page (date unknown, prior to Mar. 2, 2011, possibly prior to Mar. 17, 1997).

Brandt: Model 940-6 High Speed Sorter/Counter, 2 pages (date unknown, prior to Oct. 31, 1989).

Brandt: System 945 High-Speed Sorter, 2 pages (date unknown, prior to Mar. 2, 2011, possibly prior to Mar. 17, 1997).

Brandt: Model 952 Coin Sorter/Counter, 2 pages (date unknown, prior to Oct. 31, 1989).

Brandt: Model 954 Coin Sorter/Counter, 2 pages (date unknown, prior to Oct. 31, 1989).

Brandt: Model 957 Coin Sorter/Counter, 2 pages (date unknown, prior to Oct. 31, 1989).

Brandt: Model 958 Coin Sorter/Counter, 5 pages ( © 1982).

Brandt: Model 960 High-Speed Coin Sorter & Counter, 2 pages (1984).

Brandt; Model 966 Microsort™ Coin Sorter and Counter, 4 pages, (1979).

Brandt: Model 970 Coin Sorter and Counter, 2 pages (1983).

Brandt: Model 1205 Coin Sorter Counter, 2 pages (1986).

Brandt: Model 1400 Coin Sorter Counter, 2 pages (date unknown, prior to Mar. 2, 2011, possibly prior to Mar. 17, 1997).

Brandt: Model 8904 Upfeed—"High Speed 4-Denomination Currency Dispenser," 2 pages (1989).

Brandt: Mach 7 High-Speed Coin Sorter/Counter, 2 pages (1992).

Case ICC Limited: CDS Automated Receipt Giving Cash Deposit System, 3 pages (date unknown, prior to Nov. 15, 2000).

Cash, Martin: Newspaper Article "Bank Blends New Technology With Service," Winnipeg Free Press, 1 page (Sep. 4, 1992).

Childers Corporation: Computerized Sorter/Counter, "To coin an old adage, time is money . . . ,"3 pages (1981).

CTcoin: CDS602 Cash Deposit System, 1 page (date unknown, prior to Jan. 15, 2001).

Cummins: Cash Information and Settlement Systems (Form 023-1408), 4 pages (date Dec. 91).

(56) References Cited

OTHER PUBLICATIONS

Cummins: The Universal Solution to All Coin and Currency Processing Needs (Form 13C1218 3-83), 1 page (Mar. 1983).
Cummins: JetSort® High Speed Sorter/Counter Kits I & J—Operating Instructions (Form 022-7123-00) 12 pages (1994).
Cummins: JetSort® Coin Sorter Counter/CA-130XL Coin Wrapper, Cummins Automated Money Systems (AMS) Case Study—Fifth-Third, "6,000 Coin Per Minute Counter/Sorter Keeps pace With Fifth-Third Bank's Money Processing Needs," (Form 13C1180), 2 pages (Nov. 1981).
Cummins: JetSort®, "Venders Love JetSort," (13C1255), 1 page (Mar. 1987).
Cummins: JetSort® "High Speed Coin Sorter & Counter for Payphone Applications," "CTOCS Ready" (Form 023-1365), 2 pages (Mar. 1989).
Cummins: JetSort® mailer, "One moving part simplicity," "Vendors—Are validators changing your coin and currency needs?" (Form 023-1297), 3 pages (Apr. 1987).
Cummins: JetSort® Series V High Speed Coin Sorter/Counter, (Form 023-1383), 2 pages (Sep. 1990).
Cummins: JetSort® "Time for a Change, Be a smashing success!," (Form 023-1328), 1 page (Jun. 1988).
Cummins: JetSort® "Time for a Change—JetSort® vs. Brandt X," (Form 023-1330), 1 page (Jun. 1988).
Cummins: JetSort® "Time for a Change—No Coins Sorted After 3:00 or on Saturday," (Form 023-1327), 1 page (Aug. 1988).
Cummins: JetSort®, "What do all these Banks have in Common . . . ?", JetSort, CA-130XL coin wrapper, CA-118 coin wrapper, CA-4000 JetCount, (13C1203), 3 pages (Aug. 1982).
Cummins: JetSort® 700-01/CA-118 Coin Wrapper, Cummins Automated Money Systems (AMS) Case Study—University State Bank, "Cummins Money Processing System Boosts Teller Service at University State Bank," (Form 13C1192), 2 pages (Mar. 1982).
Cummins: JetSort® 700-01, Cummins Automated Money Systems (AMS) Case Study—First State Bank of Oregon, "JetSort® Gives Bank Coin Service Edge," (Form 13C1196), 2 pages (Apr. 1882).
Cummins: JetSort® 700-01 Coin Sorter/Counter, Operating Instructions, 14 pages (1982).
Cummins: JetSort® 701, Cummins Automated Money Systems (AMS) Case Study—Convenco Vending, "High Speed Coin Sorter increases coin processing power at Convenco Vending," (Form 13C1226), 2 pages (Jul. 1983).
Cummins: JetSort Models 701 and 750 , "State-of-the-art coin processing comes of age," 2 pages (Feb. 1984).
Cummins: JetSort® Model CA-750 Coin Processor (Item No. 50-152), 1 page (Jul. 1984).
Cummins: JetSort® Model CA-750 Coin Sorter/Counter and CA-4050 JetCount currency counter, "Money Processing Made Easy," (Form 13C1221) 2 pages (Jun. 1983).
Cummins: JetSort® Model 1701 with JetStops, Operating Instructions Manual (Form 022-1329-00), 16 pages (1984).
Cummins: JetSort® Model 1760 brochure, (Form 023-1262-00), 2 pages (Jul. 1985).
Cummins: JetSort® Models 1770 and 3000, Communication Package specification and operating instructions, 10 pages (uncertain, possibly Nov. 1985).
Cummins: JetSort® Model 1770, "JetSort® Speed and Accuracy, Now with Communications!", (Form 023-1272) 1 page (Oct. 1986).
Cummins: JetSort® 2000 Series High Speed Coin Sorter/Counter (Form 023-1488), 2 pages (Oct. 2000).
Cummins: JetSort® 3000 Series High Speed Coin Sorter (Form 023-1468 Rev 1), 2 pages (Feb. 1995).
Cummins: JetSort®3000 Series Options, "Talking JetSort 3000," (Form 023-1338-00), 1 page (between Jan. 1989-Feb. 1989).
Cummins: JetSort® 3000, "3,000 Coins per Minute!," (Form 023-1312), 1 page (date unknown, est. 1987).
Cummins: JetSort® 3200, Enhanced electronics for the JetSort® 3200 (Form 023-1350), 1 page (Apr. 1987).
De La Rue: CDS 500 Cash Deponier System, 6 pages (date unknown, p. 5 has date May 94, p. 6 has date Dec. 1992) (German).
De La Rue: CDS 5700 and CDS 5800 Cash Deponier System (German) and translation, 7 pages (date unknown, prior to Aug. 13, 1996).
Diebold: Merchant MicroBranch, "Merchant MicroBranch Combines ATM After-Hour Depository Rolled-Coin Dispenser," Bank Technology News, 1 page (Nov. 1997).
Fa. GBS-Geldbearbeitungssysteme: GBS9401SB Technical Specification, 24 pages (date unknown, prior to Nov. 10, 2010).
Frisco Bay: Commercial Kiosk, "Provide self-service solutions for your business customers," 4 pages (date unknown, prior to Mar. 2, 2011, p. 4 has date 1996).
Glory: AMT Automated Merchant Teller, 4 pages (date unknown, prior to Jan. 15, 2001).
Glory: CRS-8000 Cash Redemption System, 2 pages (1996).
Hamilton: Hamilton's Express Banking Center, In Less Space Than a Branch Manager's Desk, 4 pages (date unknown, prior to Jan. 15, 2001).
Intellectual Australia Pty. Ltd.: Microbank, "From down under: Microbank," "hand-held smart card terminal that combines smart card functions and telephone banking," 2 pages (Feb. 1996).
ISH Electronic: ISH I2005/500 Coin Counter (with translation), 4 pages (date unknown, prior to Aug. 1996).
ISH Electronic: ISH I2005/501 Self-Service Unit (with translation), 4 pages (date unknown, prior to Aug. 1996).
Namsys, Inc.: Namsys Express, Making currency management . . . more profitable, 2 pages (date unknown, prior to Jan. 15, 2001).
NGZ Geldzahlmaschinengesellschaft: NGZ 2100 Automated Coin Depository, 4 pages (date unknown, prior to Sep. 1996).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Aug. 13, 1996, maybe Feb. 1995).
Reis Eurosystems: CRS 6520/ CRS 6525 Standard-Class Coin Deposit Systems, 1 page (date unknown, prior to Apr. 2003).
Reis Eurosystems: CS 3510 Disc-Sorter, 1 page (date unknown, prior to Apr. 2003).
Royal Bank: HEMEON, Jade, "Royal's Burlington drive-in bank provides customers 24-hour tellers," the Toronto Star, 1 page (Aug. 31, 1991).
Royal Bank: LEITCH, Carolyn, "High-Tech Bank Counts Coins," The Globe and Mail, 2 pages (Sep. 19, 1991).
Royal Bank: OXBY, Murray, "Royal Bank Opens 'Super Branch,'" The Gazette Montreal, 2 pages (Sep. 14, 1991).
Royal Bank: SuperBranch, "Experience the Ultimate in Convenience Banking," 2 pages (Feb. 1992).
Scan Coin: International Report, 49 pages (Apr. 1987).
Scan Coin: Money Processing Systems, 8 pages (date unknown, prior to Apr. 2003).
Scan Coin: World, 2 pages (Feb. 1988).
Scan Coin: CDS Cash Deposit System, 6 pages (date unknown, prior to Apr. 2003) [SC 0369].
Scan Coin: CDS Coin Deposit System—Technical Referens Manual, 47 pages (1989).
Scan Coin: CDS 600 User's Manual, 14 pages (date unknown, prior to Apr. 2003).
Scan Coin: CDS 600 & CDS 640 Cash Deposit System—Technical Manual, 45 pages (date unknown, prior to Apr. 2003).
Scan Coin: CDS MK 1 Coin Deposit System—Technical Manual, 32 pages (1991).
Scan Coin: SC 102 Value Counter Technical Manual, 28 pages (date unknown, prior to Apr. 2003).
Pay by Touch: Secure ID News, "Piggly Wiggly Extends Biometric Payments Throughout The Southeast U.S.," 2 pages, (Dec. 14, 2005).
ESD, Inc: Smartrac Card System, "Coinless laundry makes quarters obsolete; Smartrac Card System really makes a change in laundry industry," Business Wire, 2 pages (Feb. 23, 1996).
Meece, Mickey: Article "Development Bank of Singapore Gets Cobranding Edge with Smart Cards," American Banker, New York, NY, vol. 159, Iss. 195, p. 37, 2 pages (Oct. 10, 1994).

METHOD AND APPARATUS FOR VARYING COIN-PROCESSING MACHINE RECEPTACLE LIMITS

CROSS-REFERENCE TO RELATED APPLICATIONS

This application is a continuation of, and claims priority to, U.S. patent application Ser. No. 11/055,152, entitled "Method And Apparatus For Varying Coin-Processing Machine Receptacle Limits" filed on Feb. 10, 2005.

TECHNICAL FIELD

The present concepts are directed generally to coin processing devices and, more specifically, to a coin processing system and method having a feature providing increased coin-receptacle utilization.

BACKGROUND

Coin processing devices such as coin redemption machines allow users to exchange bulk coins deposits for another form of physical currency such as bills, redeemable or negotiable instruments, or electronic currency (e.g., credit to an account or a stored value on a smart card). Typically, coin redemption machines are disposed in public locations such as in a retail store or bank.

Current coin-processing machines employ bags or bins. The control system is set up so that, at a predetermined number of coins (e.g., 55,000) of any denomination, the machine is taken off-line/shut down until the bags/bin can be removed by an appropriate service. This predetermined number of coins is based on an assumption of a certain mix of coins and the volume associated with that assumed mix of coins.

However, in many instances, the assumed mix of coins may not reflect the actual mix typically seen in certain facilities. For example, one facility may generally receive one mix of coins, reflecting a concentration of one denomination of coin (e.g., 50% quarters, 20% dimes, 20% nickels, 10% pennies) whereas a second facility may generally receive another mix of coins (e.g., 30% quarters, 30% dimes, 20% nickels, 20% pennies). In these instances, the number of coins and the volumes occupied thereby would differ. Coin-processing machines programmed to stop receiving transactions after a pre-set number of coins have been processed by the machine may not fully utilize the volume of the bin.

Since the cost to empty the bin (i.e., the charge by the service company) is fixed and is independent of the actual number of coins in the bin or weight of the coins in the bin, it would be beneficial to optimize the number of coins that may be received by the bin or bag.

SUMMARY

According to one embodiment, a method for optimizing a usable volume of a coin receptacle associated with a coin-processing device includes receiving a plurality of coins in a coin input area of the coin-processing device, obtaining data for each coin from at least one sensor, associating the data for each coin with a denomination, depositing all of the received plurality of coins with an associated denomination into the coin receptacle of the coin-processing device, the coin receptacle being configured to accept, but not dispense, deposited coins until a maximum number of coins occupy the coin receptacle and to securely store the coins in the coin receptacle until removal of the coin receptacle from the coin-processing device and adjusting, responsive to the data, an upper limit of the maximum number of coins which may be deposited into the coin receptacle.

In another aspect, a coin-processing system is provided which includes a coin processing machine and a coin receptacle associated therewith which is configured to receive coins input into the coin processing machine. A sensor and/or a switch is provided and is disposed to output a signal in response to a condition in a coin-processing machine coin receptacle. A means for updating an upper limit of coins which may be received within the coin receptacle and/or a remaining number of coins which may be received within the coin receptacle is also provided. In one aspect, this means for updating includes a controller. The coin receptacle is configured to accept, but not dispense, deposited coins and configured to securely store the coins in the coin receptacle until removal of the coin receptacle from the coin-processing device.

In another aspect of the present concepts, a coin-processing system is provided which includes a coin processing machine and a coin receptacle associated therewith, the coin receptacle being configured to receive coins input into the coin processing machine. The coin-processing system also includes a sensor or a switch disposed to output a signal in response to a condition in a coin-processing machine coin receptacle. A controller comprising a processor is also provided to calculate an upper limit of coins permitted to be input into the coin receptacle based at least in part upon the signal output by the sensor or switch, or a signal related thereto. The coin receptacle is configured to accept, but not dispense, deposited coins and configured to securely store the coins in the coin receptacle until removal of the coin receptacle from the coin-processing device.

This summary of the present invention is not intended to represent each embodiment, or every aspect, of the present concepts. Additional features and benefits of the present concepts are apparent from the detailed description, figures, and claims set forth below.

Figure 1:
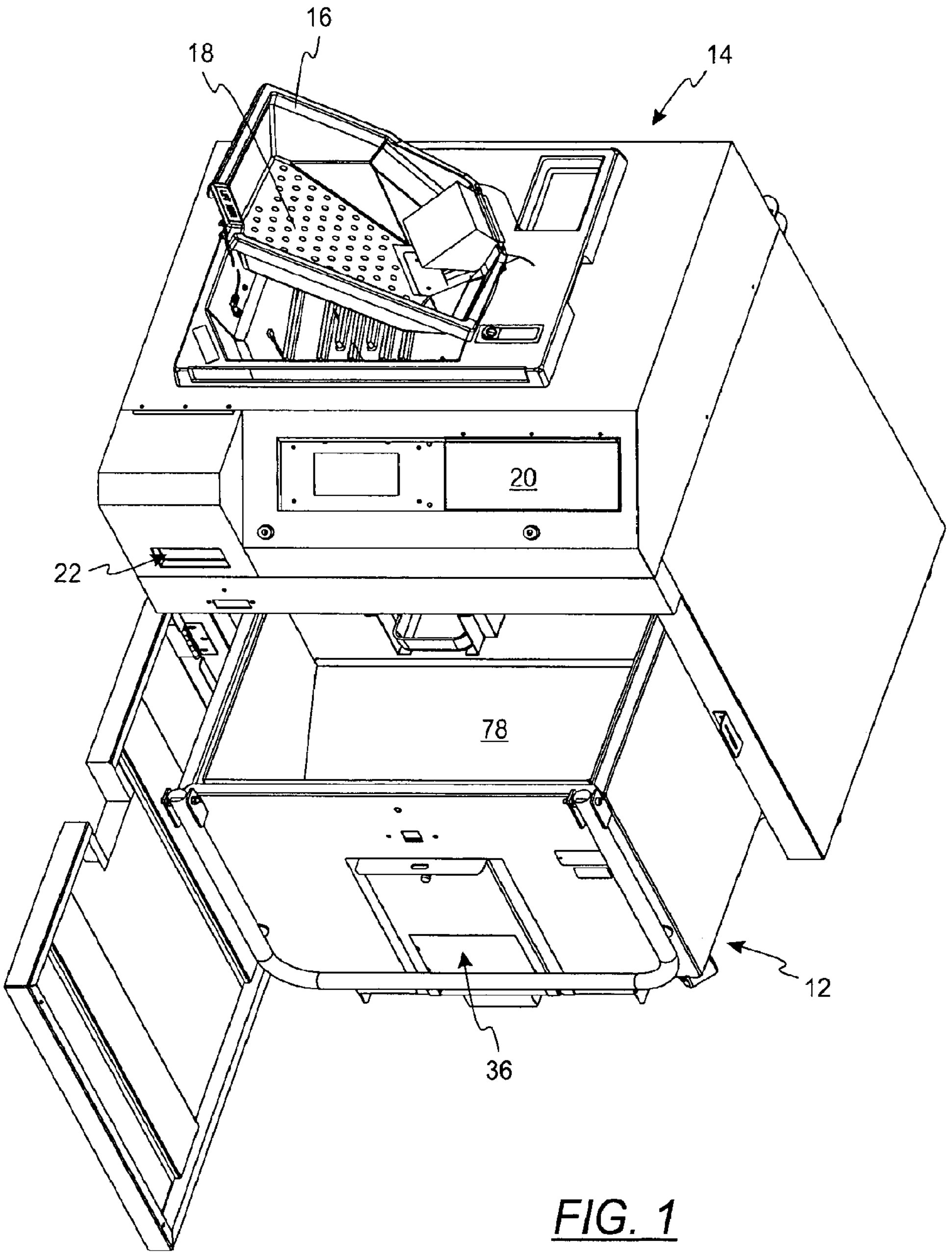
FIG. 1 is a perspective view of a coin processing machine and removable coin bin suitable for use in accord with the present concepts.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

As noted above, the present concepts are directed generally to coin processing devices and, more specifically, to a coin processing system and method having features providing increased coin-receptacle utilization.

FIG. 1 shows an example of a coin processing device 14, which may comprise a coin processing device for use with a coin redemption machine, automatic teller machine (ATM), coin counter, coin sorter, funds processing machine, vending machine, toll-booth machine, or a gaming machine. FIG. 1 also shows a removable coin bin 12 partially inserted into a corresponding cavity within the coin processing device 14. The coin processing device 14 includes a coin input tray 16, such as that described in U.S. Pat. No. 4,964,495, which is incorporated herein by reference in its entirety, configured to receive a plurality of coins from a user of the device 14. The coin input tray 16 may optionally include a perforated bottom 18 for sifting debris intermixed with the coins. Once coins are received in the input tray 16, the user upwardly pivots the input tray 16 to the position shown in FIG. 1 to cause coins to be directed under the force of gravity into the coin processing device 14.

A user interface 20 is disposed on the front of the coin processing device 14 for receiving user inputs and for displaying information to the user. According to one embodiment, the user interface 20 may comprise a touch-screen-type user interface. In other embodiments, the user interface may comprise a separate display and keypad.

The coin processing device 14 further includes a media slot 22 into which the user may insert an account card (e.g., a bank card such as an ATM card, an identification card including the type distributed by grocery stores, a smartcard, etc.). The media slot 22 is coupled to a media reader device or a media reader/writer device in the coin processing device 14 that is capable of reading from or writing to one or more types of media including ATM cards, credit card, smartcards, radio frequency devices, or other types of media cards or devices. This media may include various types of memory storage technology such as magnetic storage, solid state memory devices, and optical devices. The user interface 20 typically provides the user with a menu of options which prompts the user to carry out a series of actions for identifying the user by displaying certain commands and requesting that the user input information (e.g., a user PIN, account number, etc.).

In general, when the coin processing device is used in a coin redemption application, the coin processing device 14 receives from a user as described, and after these deposited coins have been processed (e.g., authenticated, counted, sorted, or otherwise processed), the coin processing device 14 outputs a transaction ticket to the user indicative of the dollar amount of the deposited coins. The user can redeem the transaction ticket for funds from an attendant of the coin machine 14. An attendant may include a store employee such as a cashier at a grocery store or a teller at a bank. Alternatively, the user can redeem the transaction ticket for credit towards purchases at the store where the machine is located.

In accord with the present concepts, there are provided, generally, a method, system, and apparatus for monitoring a mix of coins input into the coin-processing machine and calculating an upper limit of the coins in an associated receptacle (e.g., a bag or bin).

Coin discrimination devices are disclosed, by way of example, in U.S. Pat. No. 6,755,730, "Disc-type coin processing device having improved coin discrimination system"; U.S. Pat. No. 6,637,576, "Currency processing machine with multiple internal coin receptacles"; U.S. Pat. No. 6,612,921, "High speed coin sorter having a reduced size"; U.S. Pat. No. 6,039,644, "Coin sorter"; U.S. Pat. No. 5,782,686, "Disc coin sorter with slotted exit channels"; U.S. Pat. No. 5,743,373, "Coin discrimination sensor and coin handling system"; U.S. Pat. No. 5,630,494, "Coin discrimination sensor and coin handling system", U.S. Pat. No. 5,538,468, "Coin sorting apparatus with rotating disc"; U.S. Pat. No. 5,507,379, "Coin handling system with coin sensor discriminator"; U.S. Pat. No. 5,489,237, "Coin queuing and sorting arrangement"; U.S. Pat. No. 5,474,495, "Coin handling device"; U.S. Pat. No. 5,429,550, "Coin handling system with controlled coin discharge"; U.S. Pat. No. 5,382,191, "Coin queuing device and power rail sorter"; and U.S. Pat. No. 5,209,696, "Coin sorting mechanism," each of which is assigned to the assignee of the present application and each of which is hereby incorporated by reference in its entirety.

Figure 2:
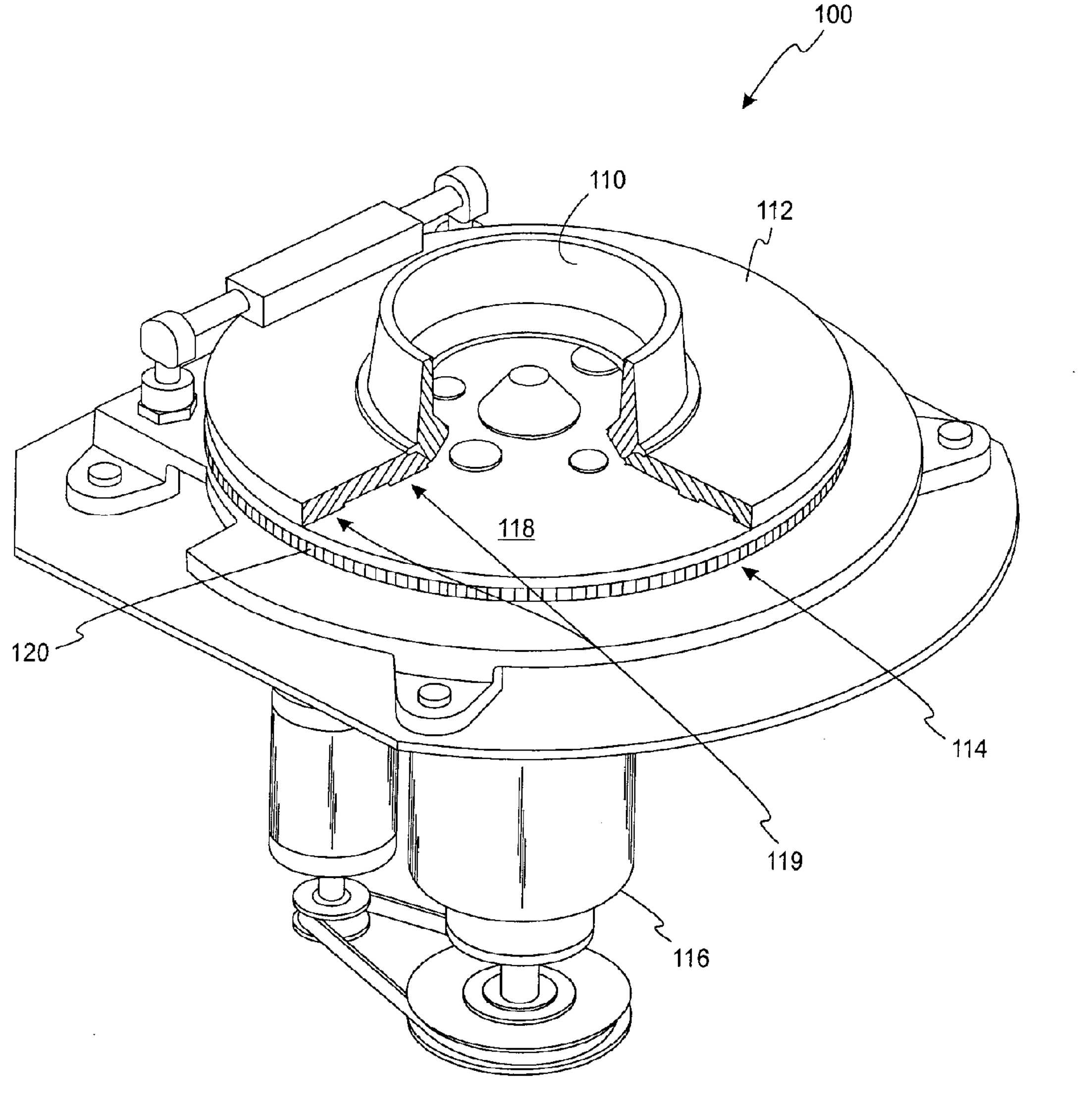
FIG. 2 is a perspective view of a coin processing device suitable for use in accord with the present concepts.

FIG. 2 shows a perspective view of one type of coin sorting device 100 useful in accord with the present concepts. Coins pass from the coin input tray 16 into hopper 110 and are deposited on the top surface of a rotating disc 114 comprising a resilient pad 118 bonded to the top surface of a solid disc 120. As the rotating disc rotates through the action of motor 116, the coins deposited thereon tend to slide outwardly over the surface of the resilient pad due to centrifugal force. As the coins move outwardly, those coins which are lying flat on the pad enter a gap between the surface of the pad 118 and a sorting head 112 spaced apart from and opposing the resilient pad. The coins are guided by channels, walls, rails, and the like 119 formed in the sorting head 112 as the coins move outwardly due to the outward radial forces and move circumferentially due to the rotational movement imparted to the coins by the resilient pad of the rotating disc. The channels, walls, and/or rails 119 of the sorting head 112 move the coins in a controlled manner (e.g., spaced or singulated) to exit stations (not shown), where they are discharged.

The various channels, walls, and/or rails 119, such as described in the aforementioned references incorporated by reference, sort the coins into their respective denominations and discharge the coins from sorting head 112 exit channels or stations corresponding to such denominations. In one aspect, the coins are sorted along a common radius by the sorting head channels, walls, and/or rails 119 as the coins approach the coin exit channels, which are each configured to discharge coins of different denominations. The first exit channel is dedicated to the smallest coin to be sorted (e.g., the dime in the U.S. coin set) and successive exit channels are dedicated to incrementally larger diameter denominations so that coins are discharged in the order of decreasing diameter.

The sorting head 112 typically includes, at some position in the coin travel path, a discrimination sensor to discriminate between valid and invalid coins. The discrimination sensor works in conjunction with an off-sorting device to remove invalid coins from the coin path to a reject area. The discrimination sensor may optionally be configured to determine the denomination of each coin passing thereby or therethrough to determine a denomination of the coins and to output a signal corresponding to the detected denomination of each coin. In another aspect, the sorting head 112 or adjacent portions of the coin sorting device 14 may include a coin counting sensor to count each coin output from each of the coin exit channels. The sorting head 112 and coin counting sensor and/or discrimination sensor thus permit the determination of a denomination and the counting of processed coins.

Figure 3:
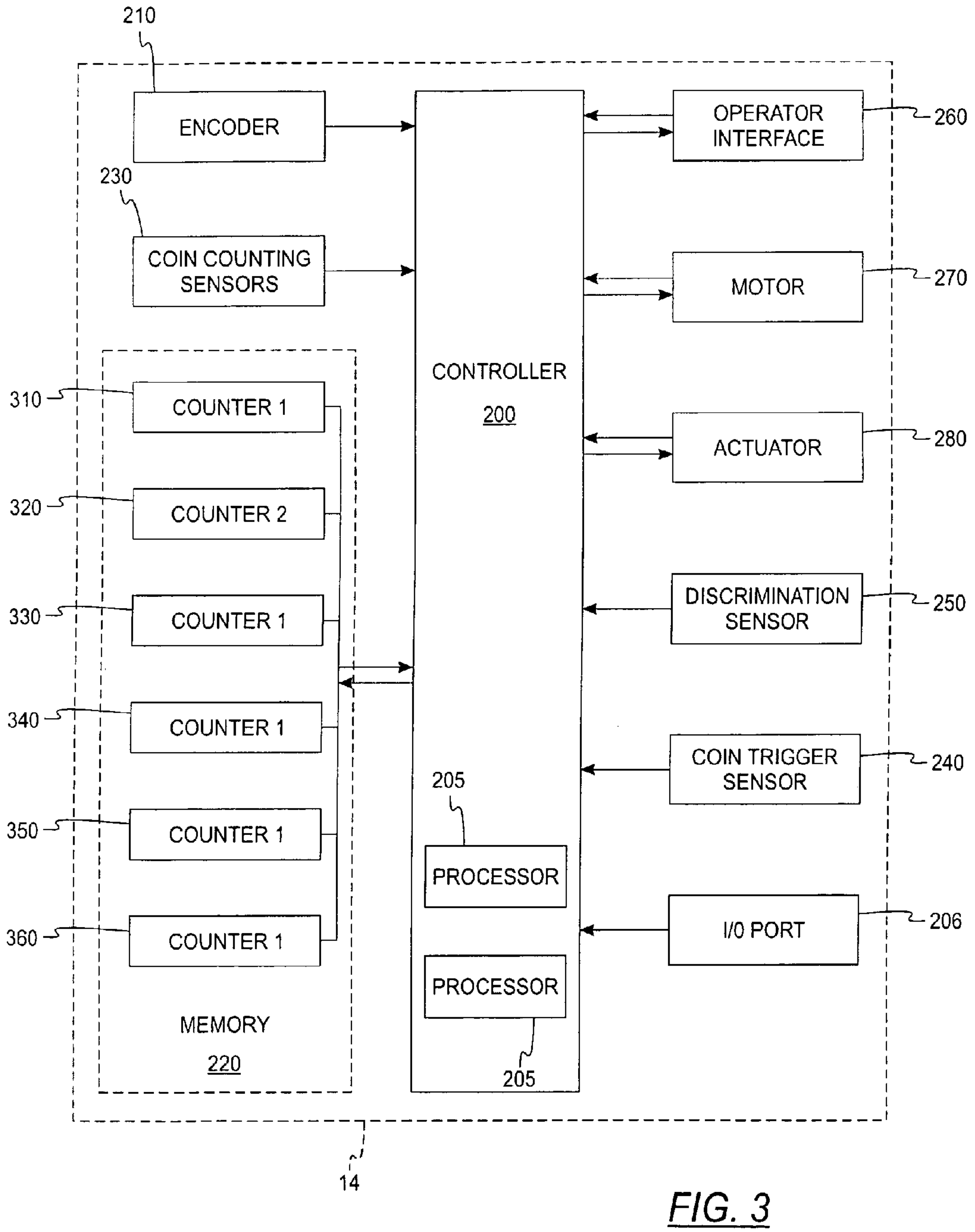
FIG. 3 is a representation of a coin processing machine and interrelated components thereof in accord with the present concepts.

FIG. 3 illustrates a controller 200 and its relationship to other components associated with the coin processing machine 14. Controller 200, as used herein, comprises any combination of hardware (e.g., processor(s), memory, etc.), software, and/or firmware that may be disposed or resident inside and/or outside of (e.g., remote from) a coin processing machine 14 or machine incorporating a coin processing device that is adapted to receive, store, hold, manipulate, process, and/or transmit signals, or any combination thereof. Controller 200 may communicate with and/or control other devices including, but not limited to, those devices 210-280 depicted in FIG. 3, such as through a conventional bus, wire, fibers, wave propagation device, transmitter, and/or I/O port 206. Controller 200 may comprise or be associated with one or more processors 205.

The controller 200 facilitates operation of the coin processing system and more particularly, permits optimization of coin receptacle 12 utilization. According to one embodiment, optimization of the coin receptacle utilization is provided by controller 200 executing one or more sequences of instructions resident in memory 220 or other computer-readable medium. Execution of the sequences of instructions contained in memory 220 causes the controller 200 to perform the various steps described herein or to output signals to other associated components to perform the various steps described herein. Hard-wired circuitry may be used in lieu of or in combination with software instructions to achieve the same end and the concepts expressed herein are not limited to any specific combination of circuitry or software.

The term computer-readable medium as used herein refers to any medium that participates in providing instructions to a processor for execution. This medium may take many forms including, but not limited to, non-volatile media (e.g., optical or magnetic disks used as storage devices), volatile media (e.g., dynamic memory, such as memory 220), and transmission media (e.g., coaxial cables, copper wire and fiber optics, acoustic waves, or light waves). Computer-readable media includes, for example, floppy disks, hard disks, CD-ROM, CD-RW, DVD, any other optical medium, RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to controller 200 for execution. For example, instructions may initially be borne on a magnetic disk of a remote computer, which can load the instructions into its dynamic memory and send the instructions over a telephone line using a modem. A modem local to coin processing machine 14 can receive the transmitted data and use an infrared transmitter to output the data to a corresponding coin processor machine IR receiver, which could then output the data to the controller 200 and/or memory 220.

The operator communicates with the coin processing machine 14 via an operator interface 260 for receiving information from an operator and displaying information to the operator about the functions and operation of the coin processing machine. The controller 200 monitors the angular position of the disc 114 using encoder 210, which sends an encoder count to the controller 200 upon each incremental movement of the disc 114. Based on input from the encoder 210, the controller 200 determines the angular velocity at which the disc 114 is rotating as well as the change in angular velocity, that is the acceleration and deceleration, of the disc 114. The encoder 210 allows the controller 200 to track the position of coins on the sorting head 112 after being sensed.

The controller 200 also controls the power supplied to the motor 116 which drives the rotatable disc 114. When the motor 116 is a DC motor, the controller 280 can reverse the current to the motor 116 to cause the rotatable disc 114 to decelerate, which permits control of the speed of the rotatable disc without the need for a brake.

The controller 200 also monitors the coin counting sensors 230 which are disposed in each of the coin exit channels of the sorting head 112 or are disposed outside of the periphery of the sorting head. As coins move past the counting sensors 230, the controller 200 receives a signal from the counting sensor 230 for the particular denomination of the passing coin and adds one to the counter for that particular denomination within the controller 200 or associated memory 220. In an alternate aspect, the discrimination sensor 250, if configured to determine the denomination of each coin passing thereby or therethrough, may output a signal corresponding to the detected denomination to the controller 200, which then adds one to the counter for that particular denomination within the controller or associated memory 220. The controller 200 thus maintains a counter for each denomination of coin that is to be sorted and a count of each denomination of coin sorted. The count for each denomination of coin being sorted by the coin processing machine 14 is continuously tallied and updated by the controller 200.

The controller 200 is able to cause the rotatable disc 114 to quickly terminate rotation after a "n" number (i.e., a predetermined number) of coins have been discharged from an output receptacle, but before the "n+1" coin has been discharged. For example, as noted above, it may be necessary to stop the discharging of coins after a predetermined number of coins have been delivered to a coin bin to prevent the coin bin from becoming overfilled. As each coin is moved passed the discrimination sensor 250, the controller 200 is able to track the angular movement of that coin as the controller receives encoder counts from the encoder 210. The controller 200 is thus able to precisely determine the point at which to stop the rotating disc 114 so that the "n.sup.th" coin is discharged from a particular output channel, but the "(n+1)th" coin is not.

The numbers and denominations of the mix of coins input into the coin-processing machine 14 are continuously monitored and updated, such as noted above, noted in the references incorporated herein, or by any other conventional techniques and devices. In accord with the present concepts, this information is used to continuously, periodically, intermittently, randomly, or occasionally, update the upper limit of the permissible coins in the associated receptacle 12 (e.g., a bag or bin). As used herein, the term "upper limit" is used to generally refer to the maximum number of coins that may be held by the coin receptacle, to the capacity of the coin receptacle, or to a particular sensed parameter corresponding to such maximum number of coins that may be held by the coin receptacle or capacity of the coin receptacle.

Figure 4:
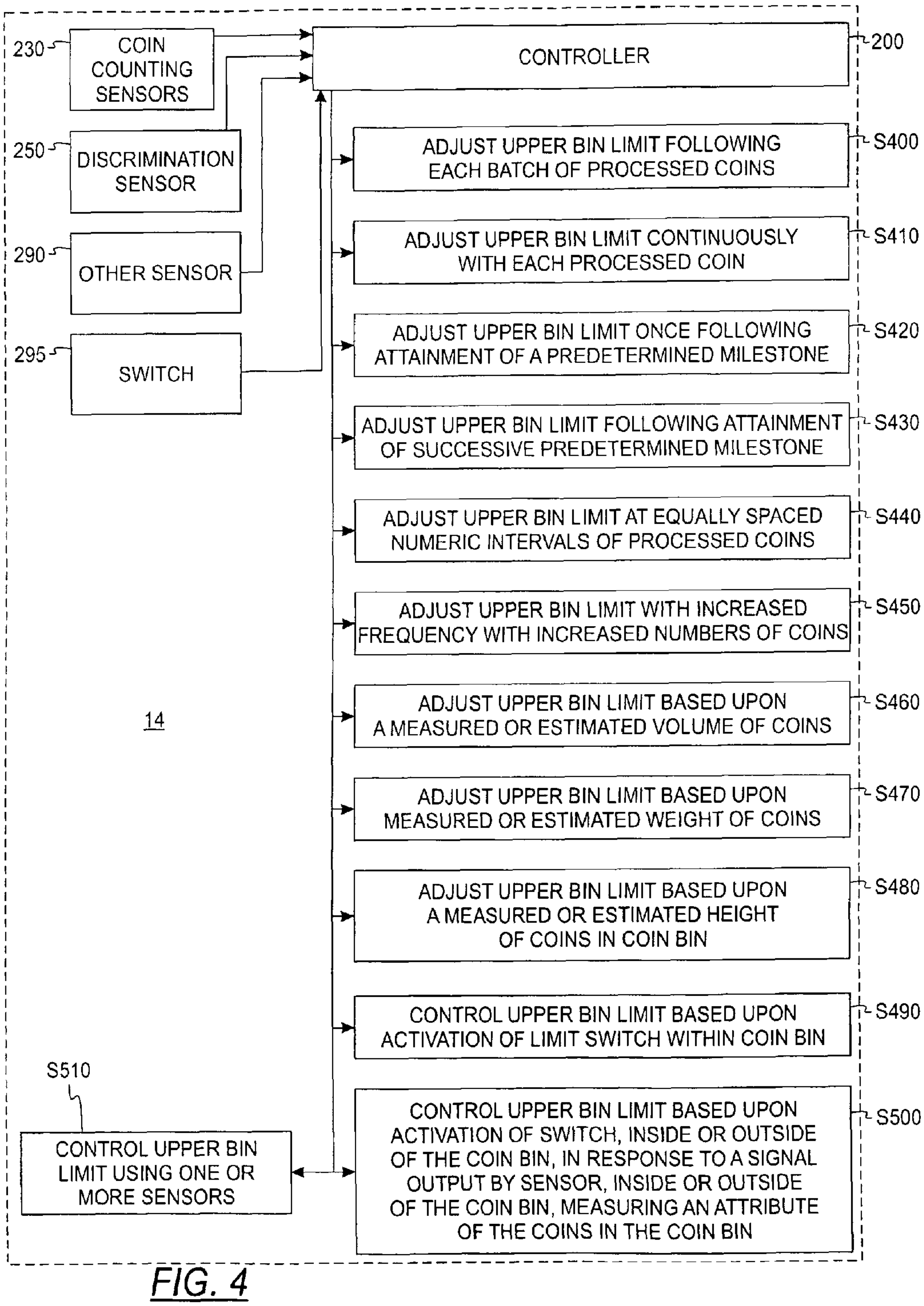
FIG. 4 is a representation of various coin receptacle control schemes in accord with the present concepts.

FIG. 4 shows various aspects of the present concepts wherein an upper limit on the number of coins in a coin receptacle is fluid (e.g., the upper limit is controlled by a sensor(s) or switch(es) and is independent of the number, count, or mix of coins) or is adjustable or adjusted in accord with one or more inputs. Although FIG. 4 refers to the specific instance of the coin receptacle 12 comprising a bin, the concepts represented by way of example in FIG. 4 apply equally to any coin receptacle 12 (e.g., bags, trays, etc.).

In one aspect, the information on the number and denomination of the mix of coins input into the coin-processing machine 14 is stored in memory 220 and is used to update the upper limit of the associated receptacle 12 after each batch of coins is input and processed (S400). Such information may alternatively be used to update the upper limit of the associated receptacle continuously with each processed coin (S410). The information on the number and denomination of the mix of coins input into the coin-processing machine 14 can also be used to update the upper limit of the associated receptacle 12 periodically or intermittently during coin processing (e.g., after every 50 coins or every 5 seconds regardless of whether or not the processing of a particular batch is still in progress). The information on the number and denomination of the mix of coins is compared, by controller 200, to an equation or equations, a look-up table, or the like, which may reside in memory 220 or firmware, to determine whether or not the upper limit of the receptacle 12 may be adjusted upwardly (or downwardly) from a default or predetermined base level (e.g., 55,000 coins).

The continuous updating of the upper limit of the receptacle 12 may start, for example, after a predetermined minimum number of coins is processed. In other words, when the receptacle is only 10% full or 30% full, such as if only about 5000 coins or 15,000 coins were processed and counted, it is generally not be necessary to calculate or refine the maximum receptacle upper limit. The calculation of the maximum receptacle limit may thus advantageously be deferred until such time as it becomes more pertinent. The predetermined minimum number of coins required to initiate continuous or even batch calculation of the maximum receptacle limit may be set to any arbitrary number or combination.

The equation(s) or look-up table(s) used to modify the upper limit of receptacle 12 may be, for example, initially established by testing data. For example, a pre-programmed look-up table may initially comprise a floor of an absolute minimum number of coins (e.g., the maximum number of the largest coin that can be suitably contained within the receptacle 12) and a plurality of other suitable coin mix values (e.g., 25% quarters, 25% nickels, 40% pennies, 10% dimes or 20% quarters, 20% nickels, 50% pennies, 10% dimes). The look-up table could contain graded combinations of common coin mixes, or could be tailored for specific areas or applications having coin mixes skewed toward particular denominations. The equation(s) or look-up table may also be supplemented and refined by updates of testing data and/or application data, which may be locally or remotely downloaded into the controller 200 and/or memory 220. The equation or a look-up table may also be updated in-situ by an adaptive or intelligent control system configured to learn what limits are appropriate for given coin mixes. The equation(s) may alternatively attempt to determine the upper receptacle 12 limit through, among other things, estimation of the aggregate volume occupied by the coins in the coin mix in combination with estimates of the spaces or voids between the coins.

The present concepts also include using the information on the number and denomination of the mix of coins input into the coin-processing machine 14 to update the upper limit of the associated receptacle 12 once following attainment of a predetermined milestone (S420). In this aspect, the update to the upper limit of the receptacle 12 could occur at some arbitrary predetermined amount that is already near the upper limit of the coin receptacle based upon a predetermined coin mix (e.g., 55,000 coins, 60,000 coins, etc.). The arbitrary predetermined amount could also be set at or near (below or above) the aforementioned floor or absolute minimum number of coins (e.g., the maximum number of the largest coin that can be suitably contained within the receptacle 12), the logic being that the machine can safely handle up to that number of coins without incident. Based on the large number of accumulated coins and the associated inertia of such large numbers of coins, the controller 200 may determine and update the upper limit of the receptacle 12 only once based on various utilization calculations. A first calculation would likely, but not necessarily, include a comparison of the coin mix of the arbitrary predetermined amount of coins to a standard (e.g., a look-up table) or to a characteristic measured or sensed by a sensor (e.g., a volume value determined by a volumetric sensor) to determine whether the coin mix at least substantially comports with a known standard. Depending on the existing coin mix, the controller 200 might perform a second calculation including a direct extrapolation of the existing coin mix or an extrapolation based on one or more models in accord with appropriate instructions from the owner, lessor, or manufacturer of the coin processing machine 14. The model for extrapolation could include, for example, an extrapolation of an expected coin mix (e.g., based on historical data), an extrapolation of a recent coin mix (e.g. the last input 10,000 coins, but not the previous 45,000 coins), a conservative extrapolation (e.g., assuming a disproportionate share of large coins), or a fiscally aggressive extrapolation (e.g., assuming a disproportionately smaller share of large coins).

In a related aspect, the information on the number and denomination of the mix of coins input into the coin-processing machine 14 is used to update the upper limit of the associated receptacle 12 following attainment of successive predetermined milestones (S430). As noted above, a first milestone could include some arbitrary predetermined amount that is already near the upper limit of the coin receptacle based upon a predetermined coin mix. This predetermined coin mix could arbitrarily be assumed to include a disproportionate share of large denomination coins so as to trigger the initial milestone conservatively early, at which time the upper limit would be adjusted upon satisfaction of additional milestones. The successive predetermined milestones could comprise any event useful to ascertain the ability of the receptacle 12 to accept additional coins. By way of example, the successive predetermined milestones could comprise additional numbers of coins in selected increments (e.g., 500 coin increments).

In another aspect, the information on the number and denomination of the mix of coins input into the coin-processing machine 14 is used to update the upper limit of the associated receptacle 12 at equally spaced intervals of processed coins (S440). The interval could be set to any predetermined number of coins. For example, the interval may be set at 10, 25, 50, 100, 250, 500, 750, 1000, 2000 or other greater, lesser, or intermediate number of coins. The update to the upper limit of the receptacle 12 could initially occur at some arbitrary predetermined number of processed coins such as, but not limited to, 50,000 coins. From that point, the upper limit of the receptacle 12 could be adjusted at one of the aforementioned or another equally spaced interval of processed coins. Alternatively, satisfactory results may likely be achieved by random or unequal intervals of processed coins. Such random or unequal intervals could be constrained to occur within a selected range or limits. For example, the range of the interval could be set to any coin count between 250 and 750 coins. The controller 200 could then randomly select a number within that interval and update the upper limit of the associated receptacle 12 upon attaining that randomly selected number of coins. Such random or unequal intervals could be guided by a fuzzy logic control scheme subject to one or more control inputs. As one example, the "other" sensor 290 could comprise any sensor such as, but not limited to, a load cell, optical sensor, displacement sensor, analog output sensor, linear sensor, distance sensor, accelerometer, acoustic sensor, inductive sensor, conductivity sensor, contact switches, etc. The controller 200 would utilize the a sensed variable, such as displacement or pressure, for example, in combination with fuzzy variables modifying the variable (e.g. "large" difference, "small" difference, "zero" difference).

In yet another aspect, the upper bin limit may be adjusted with increased frequency with increased numbers of coins (S450). In this aspect, the update to the upper limit of the receptacle 12 could initially occur at some arbitrary predetermined number of processed coins such as, but not limited to 30,000 coins. As the number of processed coins increased, the upper limit of the receptacle 12 could be periodically updated every 5,000 coins up to a count of, for example, 50,000 coins. From the 50,000 coin level, the upper limit of the receptacle 12 could be periodically updated every 1,000 coins up to a count of, for example, 55,000 coins. From the 55,000 coin level, the upper limit of the receptacle 12 could be periodically updated every 250 coins up to a count of, for example, 60,000 coins, and so on, in finer and finer increments. The controller 200 may optionally be programmed and/or configured to opt-out of the sequence indicated by step S430 partway through the sequence in response to an output from one or more sensors 290.

In another aspect, the information provided by the "other" sensor 290 could simply be used by the controller 200 as a "go" or "no go" on continued acceptance of coin input. In other words, the upper coin receptacle 12 limit may be flexibly adjusted by allowing the coin receptacle limit to be controlled by one or more coin receptacle sensors rather than by a count or assessment of a mix of coins. Sensor 290 may comprise a single sensor, a dual sensor of the same type or a different type, for redundancy, or a larger plurality of sensors. Such sensor 290 may include, for example, an ultrasonic linear position sensor, a linear position sensor, a cable extension linear position sensor, a linear encoder and associated position changing member, a capacitive linear position sensor, a position probe, a position sensor utilizing optical triangulation of reflected waves, a generic level sensor, an electrical current sensor, an inductive sensor (e.g., a proximity sensor), a magnetic sensor, and/or a charge coupled device (CCD) image sensor. Moreover, such sensor(s) 290 do not necessarily have to be high-performance sensors or sensors capable of high-resolution as performance improvements may be realized even using rudimentary sensors. In fact, considerations of simplicity, maintainability, cost, interchangeability, robustness, and (backward) compatibility may outweigh the need for precise measurement of or estimation of a characteristic of interest.

A switch 295, comprising a single switch or, alternatively, a dual switch of the same type or a different type, for redundancy, may also or alternatively be provided so as to change state (i.e., turn on or off) when the coins in the coin receptacle 12 have reached a predetermined limit (e.g., height, volume, distance of coins from predetermined point, weight, contact of coins with a predetermined point, etc.), regardless of the actual number of coins that may be present in the coin receptacle.

Using the sensor(s) 290 and/or switch(es) 295, the upper receptacle limit may adjusted based upon a measured or estimated volume of coins (S460), a measured or estimated weight of coins (S470), a measured or estimated height of coins in the coin receptacle (S480), or activation of limit switch within coin receptacle (S490). In these schemes, the sensor and/or switch output data or signals is used to adjust an upper permissible limit on the number of coins in the coin receptacle upwardly or downwardly from a predetermined point, which may include any previously calculated result. One example of this could be one or more load cells disposed to determine a weight of the coin bin, or through subtraction of a weight of the empty bin, the weight of the coins therein. Once the weight of the coins has reached a certain level, the upper limit on the number of coins may be adjusted to account for the weight of the receptacle. In this manner, if the company or group transporting the coins to the bank or other facility imposes weight limits on the receptacles or charges excess fees or penalties for exceeding a predetermined weight, then the weight could be input as a separate limiting factor on the upper limit of coins in the bin. In one alternate aspect, the number and denomination of the coins could be used in combination with an average weight for each coin type to calculate an estimated weight of the coins in the coin receptacle 12 and this estimated weight could impose another separate limitation on the upper limit of coins in the coin receptacle.

Adjustment of the upper limit is not itself necessary in accord with the present concepts. Instead, the relevancy of the number and denomination of the coins in the coin receptacle 12 may be minimized or eliminated in favor of permitting the aforementioned sensor(s) 290 and/or switch(es) 295 to actively control the upper limit of the coin receptacle. The sensor(s) 290 and/or switch(es) 295 could effectively control an upper bin limit based upon activation of switch, inside or outside of the coin receptacle 12, in response to a signal output by sensor, inside or outside of the coin receptacle, measuring an attribute of the coins in the coin (S500). Likewise, the upper bin limit could be controlled using one or more sensors providing inputs to the controller 200 (S510). In one aspect, one or more position probes may be integrated with a coin receptacle 12 (e.g., a bin) to provide a positive indication of a height of the coin mix in the receptacle. The controller may use this height information to cease processing when at least one position probe outputs a signal indicative of a predetermined height of coins, when all position probes are outputting a signal indicative of a predetermined height of coins, or when a signal output by all position probes are averaged and the average value is taken to be represent the height of the coins, which is then compared to an accepted predetermined height of coins.

In another example, a simple contact switch 295 could be placed at a position corresponding to an upper bin limit and, following contact of a coin with the switch, subsequent operation of the coin counting machine 14 is prevented and a message corresponding to the out-of-service condition is displayed on the operator interface 260 and/or transmitted by a communication device to a remote device or computer. The communication device may include, for example, a NIU (Network Interface Unit) connecting the coin counting machine 14 via a conventional I/O port (e.g. serial, parallel, 10bT) and/or communication path (e.g. IR, RC, modem, etc.). The contact switch 295 could advantageously be placed at a position just below an actual upper bin limit (e.g., by a level corresponding to a typical batch of coins) so that the coin counting machine 14 may be permitted to complete processing of a batch prior to terminating subsequent operation.

While the present concepts have been illustrated by way of example, the present concepts are susceptible to various modifications and alternative forms which may derive from or be gleaned from the present disclosure.

It should be understood, however, that the examples presented are not intended to limit the invention to the particular forms disclosed. To the contrary, the present concepts cover all modifications, equivalents, and alternatives falling within the spirit and scope of the disclosure and appended claims. For example, controller 200 or the associated instruction set controlling the operation of the controller 200 may be configured not to update an upper limit of coins which may be received within the coin receptacle, but to instead determine a remaining number of coins which may be received within the coin receptacle. In other words, the controller may count down the number of coins which may be input rather than tally or count up the coins already present. As another example, the present concepts include the marriage of the aforementioned examples with active devices (e.g., a surface leveler, a stirring device, or a vibration device) which redistribute the coins within the coin bin to even out the coin distribution or to skew the coin distribution to permit the input of additional coins. The present concepts also include the combination of any of the aforementioned examples.

As still another example, the device or system for updating the upper limit of coins which may be received within the coin receptacle or the remaining number of coins which may be received within the coin receptacle may omit the controller, or the like, and may instead simply include an I/O device transmitting a signal from the sensor to a receiver, light, display, speaker, pager, PDA, telephone, or other device, which provides an indication of the sensed condition to an operator or attendant of the machine to take an action (e.g., a manual override or manually effecting a change to a setting) which will effect the desired adjustment to the number of coins which may be received within the coin receptacle or which will otherwise effect the remaining number of coins which may be received within the coin receptacle. In other words, the adjustment need not necessarily be automatic and such adjustment can be achieved through operator intervention prompted by such output signal.

What is claimed is:

1. A method for optimizing a usable volume of a coin receptacle associated with a coin-processing device comprising the acts of:

receiving a plurality of coins in a coin input area of said coin-processing device;

obtaining data for each coin from at least one sensor;

associating said data for each coin with a denomination;

depositing all of said received plurality of coins with an associated denomination into said coin receptacle of said coin-processing device, said coin receptacle being configured to accept, but not dispense, deposited coins until a maximum number of coins occupy said coin receptacle and to securely store the coins in the coin receptacle until removal of the coin receptacle from the coin-processing device;

adjusting, responsive to said data, an upper limit of said maximum number of coins which may be deposited into said coin receptacle, and preventing input of additional coins into said coin processing machine when a total number of coins stored in said coin receptacle is substantially equivalent with or equivalent to said upper limit.

2. The method according to claim 1, further comprising the acts of:

associating said data obtained from said at least one sensor to a count corresponding to said plurality of coins deposited into said coin receptacle; and updating a counter corresponding to said plurality of coins deposited into said coin receptacle.

3. The method according to claim 1, further comprising the act of:

storing in at least one of a memory, a controller, and a computer-readable medium a count for each denomination of said plurality of coins deposited into said coin receptacle.

4. The method according to claim 1, wherein said adjusting act is performed after each batch of a plurality of coins is processed.

5. The method according to claim 1, wherein said adjusting act is performed continuously with each processed coin.

6. The method according to claim 1, wherein said adjusting act is performed following attainment of a predetermined milestone.

7. The method according to claim 1, wherein said adjusting act is performed following attainment of a plurality of predetermined milestones.

8. The method according to claim 1, wherein said adjusting act is performed at least one of periodically or intermittently during coin processing.

9. The method according to claim 1, wherein said adjusting act further comprises utilizing at least one of an equation or a look-up table.

10. The method according to claim 1, further comprising the act of:

sensing an object or objects in an interior volume of said coin receptacle to determine a remaining available interior volume of said coin receptacle for receiving additional coins.

11. The method according to claim 1, wherein said act of obtaining data comprises receiving a signal from at least one of a coin discrimination sensor, a coin counting sensor, an ultrasonic linear position sensor, a linear position sensor, a cable extension linear position sensor, a linear encoder and associated position changing member, a capacitive linear position sensor, a position probe, a position sensor utilizing optical triangulation of reflected waves, a generic level sensor, an electrical current sensor, an inductive sensor, a magnetic sensor, and a CCD image sensor.

12. The method according to claim 1, further comprising the act of:

inputting said data into at least one of a memory, a controller, and a computer-readable medium.

13. The method according to claim 7, wherein at least one of said plurality of predetermined milestones comprises at least one of a predetermined number of coins, a predetermined value of coins, a predetermined number of coins of a selected denomination, a predetermined value of coins of a selected denomination, a predetermined coin mix in combination with one of a predetermined number of coins of at least one specified denomination and a predetermined value of coins, a predetermined weight of coins, a predetermined weight of a coin receptacle containing the coins, a height of coins in a coin receptacle, a volume of coins in a coin receptacle, an activation of at least one of a passive and an active switch, and a manual input.

14. A coin-processing system comprising:

a coin processing machine comprising a coin input area, a coin processing module configured to process a plurality of randomly oriented mixed denomination coins input into said coin input area, and a coin receptacle configured to receive and store all coins of one or more recognized denominations processed by said coin processing module;

at least one sensor or switch disposed proximate said coin receptacle to sense a condition representing a status of said coin receptacle and to output a signal in response to said condition; and a controller configured to update a variable upper limit of a maximum number of coins permitted to be processed by said coin processing machine said variable upper limit responsive to receipt of denominated coins into said coin receptacle, said controller further configured to prevent input of additional coins into said coin processing machine when a total number of coins stored in said coin receptacle is substantially equivalent with or equivalent to said upper limit, wherein the coin receptacle is configured to accept, but not dispense, deposited coins and configured to securely store the coins in the coin receptacle until removal of the coin receptacle from the coin-processing device.

15. The coin-processing system according to claim 14, wherein said means for updating comprises a controller adapted to receive said signal output from said at least one sensor or switch, or a signal associated therewith.

16. The coin-processing system according to claim 15, wherein said at least one sensor or switch comprises a sensor comprising at least one of a coin discrimination sensor, a coin counting sensor, an ultrasonic linear position sensor, a linear position sensor, a cable extension linear position sensor, a linear encoder and associated position changing member, a capacitive linear position sensor, a position probe, a position sensor utilizing optical triangulation of reflected waves, a generic level sensor, an electrical current sensor, an inductive sensor, a magnetic sensor, and a CCD image sensor.

17. The coin-processing system according to claim 16, wherein said sensor is adapted to register a coin output to said coin receptacle, and wherein said controller is adapted to update a coin counter.

18. The coin-processing system according to claim 16, wherein said sensor is adapted to register a coin denomination of a coin output to said coin receptacle, and wherein said controller is adapted to update a coin denomination counter.

19. The coin-processing system according to claim 15, wherein said controller is adapted to output a signal corresponding to said variable upper limit of coins which may be received within said coin receptacle to a memory to update said memory with each processed coin.

20. The coin-processing system according to claim 15, wherein said controller is adapted to update a memory by output of a signal following attainment of at least one predetermined milestone, said signal corresponding to said variable upper limit of coins which may be received within said coin receptacle.

21. The coin-processing system according to claim 15, wherein said controller is adapted to update a memory periodically or intermittently during coin processing with information relating to said variable upper limit of coins which may be received within said coin receptacle.

22. The coin-processing system according to claim 15, wherein said controller is adapted to update a memory in accord with at least one of an equation or a look-up table by outputting a signal thereto corresponding to said variable upper limit of coins which may be received within said coin receptacle.

23. The coin-processing system according to claim 14, wherein said signal outputted in response to said condition corresponds to a sensed characteristic of an object or objects in an interior volume of said coin receptacle to determine a remaining available interior volume of said coin receptacle for receiving additional coins.

24. The coin-processing system according to claim 15, wherein said controller is adapted to update a memory after each batch of said plurality of coins is input and processed by outputting a signal corresponding to said variable upper limit of coins which may be received within said coin receptacle.

25. The coin-processing system according to claim 14, wherein said coin receptacle is a coin bin.

26. The coin-processing system according to claim 14, wherein said coin receptacle is a coin bag.

27. A coin-processing system comprising:

a coin processing machine comprising a coin processing module configured to denominate input mixed denomination coins, to count said denominated coins, and to output said denominated coins into a coin receptacle, said coin receptacle configured to receive said coins output by said coin processing module; and a controller configured to calculate an upper limit of a maximum number of additional coins permitted to be processed by said coin processing machine, said upper limit responsive to said output of said denominated coins into said coin receptacle, said controller further configured to prevent input of additional coins into said coin processing machine when a total number of coins stored in said coin receptacle is substantially equivalent with said upper limit, wherein the coin receptacle is configured to accept, but not dispense, deposited coins and configured to securely store the coins in the coin receptacle until removal of the coin receptacle from the coin-processing device.

28. The coin-processing system according to claim 27, wherein said controller further comprises a memory for storing said upper limit calculated by said controller.

29. The coin-processing system according to claim 27, further comprising:

at least one sensor or switch disposed to output a signal in response to a condition in said coin receptacle.

30. The coin-processing system according to claim 29, wherein said at least one sensor or switch is disposed within said coin receptacle.

31. The coin-processing system according to claim 29, wherein said at least one sensor or switch is disposed externally to said coin receptacle.

32. The coin-processing system according to claim 29, wherein said sensor is adapted to sense a characteristic of an object or objects in an interior volume of said coin receptacle to determine a remaining available interior volume of said coin receptacle for receiving additional coins.

33. The coin-processing system according to claim 29, wherein said coin receptacle condition is a percentage-full condition of said coin receptacle.

34. The coin-processing system according to claim 27, wherein said one or more recognized denominations consists of a United States coin set.

35. The coin-processing system according to claim 29, wherein said at least one sensor or switch comprises at least one of an ultrasonic linear position sensor, a linear position sensor, a cable extension linear position sensor, a linear encoder and associated position changing member, a capacitive linear position sensor, a position probe, a position sensor utilizing optical triangulation of reflected waves, a generic level sensor, an electrical current sensor, an inductive sensor, a magnetic sensor, or a CCD image sensor.

36. The coin-processing system according to claim 27, wherein said coin receptacle is a coin bin.

37. The coin-processing system according to claim 27, wherein said coin receptacle is a coin bag.

38. The coin-processing method according to claim 1, wherein said coin receptacle is a coin bin.

39. The coin-processing method according to claim 1, wherein said coin receptacle is a coin bag.

* * * * *